United States Patent
Asada et al.

[11] Patent Number: 5,767,666
[45] Date of Patent: Jun. 16, 1998

[54] PLANAR TYPE MIRROR GALVANOMETER INCORPOTATING A DISPLACEMENT DETECTION FUNCTION

[75] Inventors: Norihiro Asada, Saitama-ken; Masayoshi Esashi, Miyagi-ken, both of Japan

[73] Assignee: The Nippon Signal Co., Ltd, Tokyo, Japan

[21] Appl. No.: 530,103

[22] PCT Filed: Jan. 23, 1995

[86] PCT No.: PCT/JP95/00066

§ 371 Date: Sep. 26, 1995

§ 102(e) Date: Sep. 26, 1995

[87] PCT Pub. No.: WO95/20774

PCT Pub. Date: Aug. 3, 1995

[30] Foreign Application Priority Data

Jan. 31, 1994 [JP] Japan ................... 6-009824

[51] Int. Cl.$^6$ ........................... G01R 13/38; G02B 26/10
[52] U.S. Cl. ........................... 324/97; 359/198
[58] Field of Search ................... 324/97; 359/198, 359/199, 224, 900

[56] References Cited

FOREIGN PATENT DOCUMENTS

| | | |
|---|---|---|
| 56-140316 | 11/1981 | Japan . |
| 58-73802 | 5/1983 | Japan . |
| 63-225217 | 9/1988 | Japan . |
| 1-195417 | 8/1989 | Japan . |
| 1-257916 | 10/1989 | Japan . |
| 1-297617 | 11/1989 | Japan . |
| 4-211218 | 8/1992 | Japan . |
| 5-60993 | 3/1993 | Japan . |

OTHER PUBLICATIONS

T. Hirai, "Deflection by a Galvano–Scanner", Practical Laser Techniques, pp. 210–213 (1987).

*Primary Examiner*—Ernest F. Karlsen
*Attorney, Agent, or Firm*—Finnegan, Henderson, Farabow, Garrett & Dunner, L.L.P.

[57] ABSTRACT

The present invention relates to a slim-type small size mirror galvanometer wherein the mirror displacement angle can be detected, made using semiconductor manufacturing techniques. Using semiconductor manufacturing techniques, a movable plate 5 and a torsion bar 6 for axially supporting the movable plate 5 are formed integrally on a silicon substrate 2, with a planar coil 7 and a total reflecting mirror 8 formed on an upper face of the movable plate 5, and permanent magnets 10A, 10B and 11A, 11B fixedly located so as to produce a magnetic field at the planar coil 7. The direction and quantity of current flowing in the planar coil 7 is controlled to variably control the swing angle of the movable plate 5 depending on the balance between the generated magnetic force and the torsion force in the torsion bar 6. Moreover, detection coils 12A, 12B are provided beneath the movable plate 5, and a detection current is superimposed on the drive current in the planar coil 7. The mirror displacement angle is detected by a change in the mutual inductance due to the detection current, between the planar coil and the detection coils 12A, 12B.

9 Claims, 24 Drawing Sheets

PLANAR TYPE MIRROR GALVANOMETER INCORPOTATING A DISPLACEMENT DETECTION FUNCTION

TECHNICAL FIELD

The present invention relates to a mirror galvanometer suitable for example for laser beam scanning systems and the like, and in particular to an ultra small planar type mirror galvanometer with the capability of detecting the displacement of a reflecting mirror for scanning a laser beam, and its method of manufacture.

BACKGROUND ART

Mirror galvanometers are used for example in laser scanners which deflection scan a laser beam, operating on the theory that when an electrical current is passed through a movable coil arranged in a magnetic field, an electromagnetic force is generated due to the interaction between the electrical current and the magnetic flux, producing a rotational force (torque) proportional to the electrical current. The construction involves a device using galvanometer theory where a movable coil rotates to an angle where the torque and a spring force are in equilibrium, the presence or absence and size of a current being detected by an indicator needle swung by the movable coil. However instead of the indicator needle a reflecting mirror is provided on a member which rotates with the movable coil.

In practice mirror galvanometers use for example a movable piece of iron instead of the movable coil arranged in a magnetic field , with a magnetic path formed around the periphery by means of a magnetic body involving two permanent magnets and four magnetic poles. The magnetic flux between the poles is altered by changing the size and direction of a current flowing in a drive coil wound around the magnetic body, so that a reflecting mirror is swung by the movable piece of iron, to thus deflection scan a laser beam (see for example "Practical Laser Technics". Kyoritsu Publishing Company, Dec. 20 1987, p. 210–212).

With the mirror galvanometer of this construction however, miniaturization is difficult due for example to the drive coil being mechanically wound.

A technique for miniaturization of a mirror galvanometer is disclosed for example in Japanese Unexamined Patent Publication No. 4-211218.

With this technique, a frame portion, a reflecting mirror portion and a beam portion for axially supporting the reflecting mirror portion on the frame portion, are formed integrally together by means of a semiconductor manufacturing process using a silicon substrate. The portions formed on the silicon substrate are arranged on a glass substrate which is provided with an electrode for rotating the reflecting mirror portion, the construction being such that the reflecting mirror is rotated by electrostatic attraction acting between the reflecting mirror and the electrode. The beam portion is formed in an S shape enabling a long beam having a small torsional rigidity to be formed in a small space, the purpose being to enable drive of the planar portion with a small drive force without detracting from miniaturization of the mirror galvanometer.

With the mirror galvanometer, the mirror displacement angle is usually controlled by an open loop, however high accuracy control of the mirror displacement angle is possible by detecting the mirror displacement angle and feeding back the displacement signal to the mirror drive system. Methods which have been considered for detecting the displacement angle of the mirror in the abovementioned planar type mirror galvanometer involve for example an optical method as shown in FIG. 1 or a capacitance type method as shown in FIG. 2.

With the optical method of FIG. 1, a light beam, for example from an optical fibre 53, is impinged centrally onto the rear face of a reflecting mirror 52 which rotates about a shaft 51, and the reflected light is received by a PSD 55 provided on a glass substrate 54. The displacement angle $\phi$ of the reflecting mirror 52 is detected by detecting a change in an incident location X of the reflected light on the PSD 55 with angular displacement of the reflecting mirror 52. The incident location X can be expressed as $X = L/\tan(\theta + \phi)$ where L is the distance from the glass substrate 54 to the reflecting mirror 52 in a level condition, and $\theta$ is the angle between the light beam from the optical fibre 53 and the reflecting mirror 52 in a level condition.

This method has the advantage in that since the light path is short, attenuation of the light beam strength is minimal, enabling a large detection signal. However, since the light path is short there are disadvantages in that the minimum detection angle (resolution for detecting the angle of the reflecting mirror) is limited unless the diameter of the light beam is kept as small as possible, it is difficult to align the angle of the incident light beam with the axis, and the PSD must be ultra thin.

With the capacitance type method of FIG. 2, capacitors C1, C2 are formed by arranging electrodes 56A and 57A on the rear face of the reflecting mirror 52 symmetrical about the shaft 51, and arranging electrodes 56B, 57B forming pairs with the electrodes 56A, 57A on the glass substrate 54. The displacement angle of the reflecting mirror 52 is detected based on the difference in capacity between the capacitors C1, C2 caused by angular displacement of the reflecting mirror 52.

With this method however, the gap of the capacitors C1, C2 (the distance L from the glass substrate 54 to the reflecting mirror 52 in a level condition) is very large with respect to the displacement per unit angle of the reflecting mirror 52, so that the change in capacity of the capacitors C1, C2 with respect to angular displacement of the reflecting mirror 52 is small. There are thus disadvantages in that resolution for detecting the angle of the reflecting mirror is limited, and also manufacture of the reflecting mirror portion is difficult since leads must be taken out from the terminals 56A, 57A on the rear face of the reflecting mirror 52.

The present invention takes into consideration the above situation, with the object of providing a planar type mirror galvanometer incorporating a displacement detection function which can be easily manufactured, and which can detect the angular displacement of the reflecting mirror to a high resolution by converting mirror displacement of a planar type mirror galvanometer made using a semiconductor manufacturing process, into a change in mutual inductance due to electromagnetic coupling between coils, and detecting this change. A further object is to provide a method of manufacturing a planar type mirror galvanometer incorporating a displacement detection function.

DISCLOSURE OF THE INVENTION

Accordingly, the planar type mirror galvanometer incorporating a displacement detection function of the present invention comprises; a semiconductor substrate having a planar movable plate and a torsion bar for axially supporting the movable plate so as to be swingable in a perpendicular direction relative to the semiconductor substrate formed integrally therewith, a planar coil for generating a magnetic field by means of an electric current for driving the movable plate, laid on an upper face peripheral edge portion of the movable plate, a reflecting mirror provided on an upper face central portion which is surrounded by the planar coil, and magnets forming pairs with each other fixed so as to produce a magnetic field at the planar coil portions on the opposite sides of the movable plate which are parallel with the axis of the torsion bar, and is constructed so that a plurality of detection coils capable of electromagnetic coupling with the planar coil for detecting displacement of the movable plate, are provided beneath the movable plate and disposed at approximate symmetrical locations with respect to the torsion bar, and a displacement detection current is superimposed on the current in the planar coil for driving the movable plate.

With such a construction, the distance between the planar coil and the detection coils changes with rotation of the movable plate, causing a change in the mutual inductance between the planar coil and the detection coils with the change in distance. The displacement angle of the reflecting mirror can thus be output as the change in mutual inductance. Moreover, since the detection value of the mutual inductance changes depending on the number of windings in the detection coil, the number of detection coil windings can be set to suit the resolution for detecting the displacement angle of the reflecting mirror, enabling the change in displacement angle of the reflecting mirror to be detected to a high resolution. Furthermore the construction is simple without the need for any new additions to the reflecting mirror side.

The movable plate may comprise; a frame shape outer movable plate axially supported relative to the semiconductor substrate by a first torsion bar, and an inner movable plate axially supported inside the outer movable plate by a second torsion bar axially perpendicular to the first torsion bar, with a first planar coil provided on an upper face of the outer movable plate, and a second planar coil provided on an upper face peripheral edge portion of the inner movable plate, and the reflecting mirror provided on a central portion of the inner movable plate which is surrounded by the second planar coil, and the detection coils may be respectively disposed at symmetrical locations with respect to the first and second torsion bars.

With such a construction wherein the inner and outer movable plates are axially supported by torsion bars arranged perpendicular to each other, laser beam deflection scanning can be carried out in two dimensions, giving an increase in the scanning region for a laser beam and the like.

The construction may also be such that an upper substrate and a lower substrate are respectively provided on upper and lower faces of the semiconductor substrate, and the magnets are respectively fixed to both substrates.

Moreover, the construction may be such that a movable plate accommodating space is tightly sealed by means of the upper substrate and the lower substrate, and evacuated. The swinging resistance on the movable plate due to air can thus be eliminated, enabling an increase in the swing amplitude of the movable plate.

Furthermore, with the movable plate accommodating space tightly sealed, an inert gas such as helium or argon may be introduced thereto. Then when the drive current flowing in the planar coil is increased to give a large displacement of the movable plate, the heating effect from the planar coil can be reduced compared to the situation with a vacuum.

Moreover, the movable plate accommodating space may be formed by providing a recess in a central portion of the upper and lower substrates. A step in processing the semiconductor substrate to ensure a movable plate accommodating space in which the movable plate can swing freely can thus be omitted.

Moreover, the magnets may be permanent magnets.

A method of manufacturing a mirror galvanometer incorporating a displacement detection function according to the present invention includes; a step of piercing a semiconductor substrate excluding a portion forming a torsion bar, by anisotropic etching from the substrate lower face to the upper face to form a movable plate which is axially supported on the semiconductor substrate by the torsion bar portion so as to be swingable, a step of forming a planar coil on the upper face periphery of the movable plate by electroplating, a step of forming a reflecting mirror on a central portion of the movable plate which is surrounded by the planar coil by vapor deposition of aluminum, a step of fixing an upper substrate constructed such that light can pass at least through a region above the movable plate, and a lower substrate, to upper and lower faces of the semiconductor substrate by anodic splicing, a step of fixing magnets to upper and lower substrate portions which correspond to the opposite edges of the movable plate which are parallel with the axis of the torsion bar, and a step of forming a detection coil at a predetermined location on the lower substrate.

With the method of manufacturing the mirror galvanometer the step of forming the planar coil may involve a coil electroforming method.

More specifically, this may involve forming a nickel layer on the semiconductor substrate by sputtering, then forming a copper layer on the nickel layer by electroplating or sputtering. Subsequently masking the portion corresponding to the planar coil portion and carrying out successive copper etching and nickel etching. Then removing the mask, and copper electroplating over the coil pattern.

If the planar coil is formed using the above methods, it is possible to lay a thin film coil with a low resistance at a high density.

BEST MODE FOR CARRYING OUT THE INVENTION

Embodiments of the present invention will now be described with reference to the figures.

Figure 1:
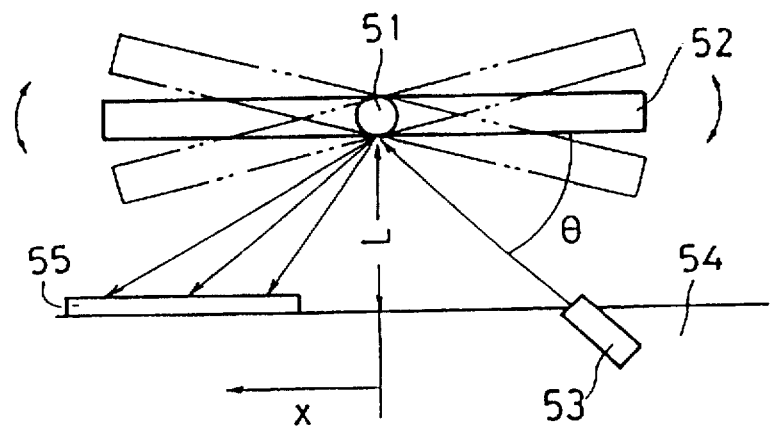
FIG. 1 is a diagram illustrating an example of an optical method for detecting displacement angle.
Figure 2:
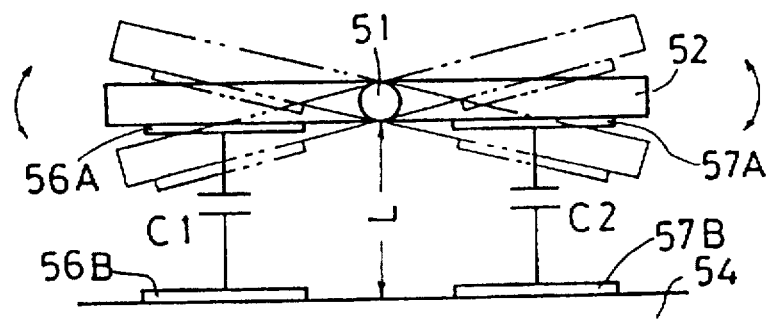
FIG. 2 is a diagram illustrating an example of a capacitance type method for detecting displacement angle.
Figure 3:
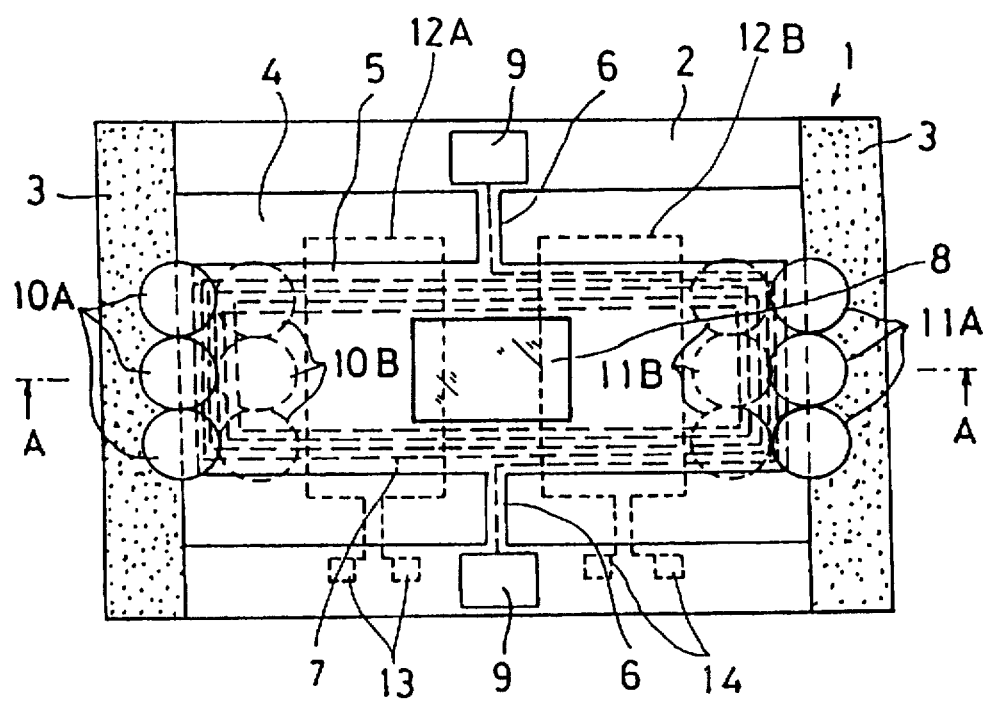
FIG. 3 is a schematic diagram showing the construction of a first embodiment of a mirror galvanometer according to the present invention.
Figure 4:
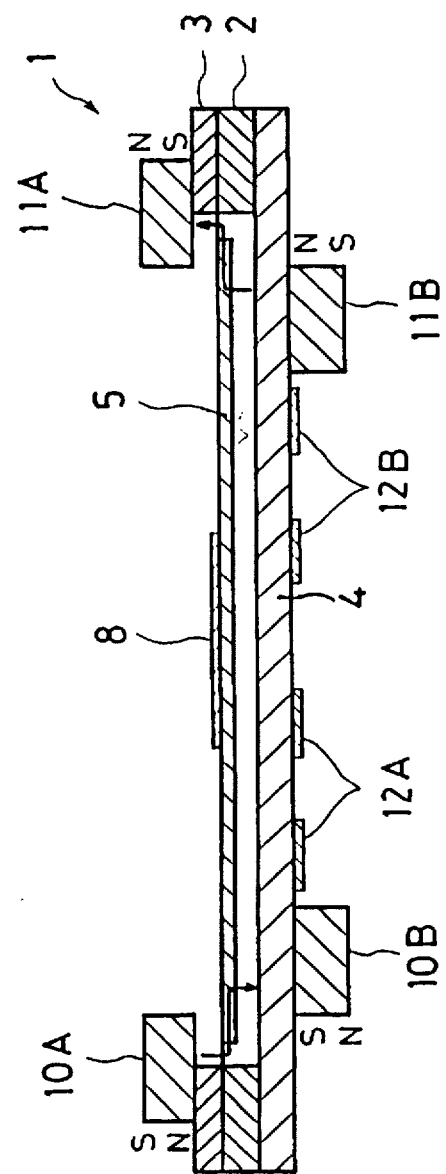
FIG. 4 is a cross sectional view in the direction of arrows A—A of FIG. 3.

FIGS. 3 and 4 show a first embodiment of a planar type mirror galvanometer according to the present invention. This example is for a single axis torsion bar arrangement.

In FIGS. 3 and 4, a mirror galvanometer 1 has a triple layer construction with respective planar upper and lower glass substrates 3, 4 (upper and lower insulating substrates) made for example from borosilicate glass and the like, anodic spliced to upper and lower faces of a silicon substrate 2 (semiconductor substrate). The upper glass substrate 3 is laminated onto left and right edges (in FIG. 3) of the silicon substrate 2 so as to leave open a region above a planar movable plate 5 (discussed hereunder).

The planar movable plate 5, and torsion bars 6, 6 for axially supporting the movable plate 5 at a central location thereof so as to be swingable in a perpendicular direction relative to the silicon substrate 2, are formed integrally with the silicon substrate 2 by anisotropic etching used in semiconductor manufacturing processes. The movable plate 5 and the torsion bars 6, 6 are therefore both made from the same material as the silicon substrate 2. A planar coil 7 made from a thin copper film for carrying a drive current for the movable plate 5 and a detection current for detecting displacement angle superimposed on the drive current, is provided on the upper face peripheral edge portion of the movable plate 5 and covered with an insulating film. The detection current is for detecting displacement of the movable plate 5 based on mutual inductance between detection coils 12A, 12B provided on the lower glass substrate 4 as described later.

Here if for the planar coil 7, a high resistance thin film coil having a Joule heat loss due to the resistance portion is laid at high density, the drive force will be limited due to heating. Therefore, with the present embodiment, the planar coil 7 is formed by a heretofore known coil electroforming method using electroplating. The coil electroforming method has the characteristic that a thin film coil can be laid with low resistance and at a high density, and is effective in the miniaturisation and slimming of micro-magnetic devices. It involves forming a thin nickel layer on a substrate by sputtering, then forming a copper layer on the nickel layer by electroplating or sputtering. Subsequently removing the copper layer and nickel layer except at the portions corresponding to the coil. Then copper electroplating over the coil pattern to form a thin film planar coil. A total reflecting mirror 8 is formed as a reflecting mirror on an upper face central portion of the movable plate 5 which is surrounded by the planar coil 7, by vapor deposition of aluminum. Moreover, a pair of electrode terminals 9, 9 electrically connected to the planar coil 7 by way of portions of the torsion bars 6, 6, are provided on the upper face of the silicon substrate 2 beside the torsion bars 6, 6. The electrode terminals 9, 9 are formed on the silicon substrate 2 at the same time as forming the planar coil 7, by the coil electroforming method.

Cylindrical shaped permanent magnets 10A, 10B and 11A, 11B, are provided in pairs on the left and right sides (in the figures) of the upper and lower glass substrates 3, 4, so as to produce a magnetic field at the planar coil 7 portions on the opposite sides of the movable plate 5 which are parallel with the axis of the torsion bars 6, 6. The three pairs of upper and lower permanent magnets 10A, 10B, are arranged so that the upper and lower polarities are the same. For example, as shown in FIG. 4, so that lower side is the north pole and the upper side the south pole. Moreover, the other three pairs of permanent magnets 11A, 11B, are similarly arranged so that the upper and lower polarities are the same. For example, as shown in FIG. 4 so that lower side is the south pole and the upper side the north pole. Also, as is clear from FIG. 4, the permanent magnets 10A, 11A on the upper glass substrate 3, and the permanent magnets 10B, 11B on the lower glass substrate 4, are arranged so that the upper and lower polarities are mutually opposite.

The pair of detection coils 12A, 12B (shown typically as a single dotted line in FIG. 3, but in actuality being a plurality of windings) are patterned onto the lower face of the lower glass substrate 4, being arranged so as to be capable of electromagnetic coupling with the planar coil 7, with respective terminals electrically connected to the pairs of electrode terminals 13, 14. The detection coils 12A, 12B are disposed at symmetrical locations with respect to the torsion bar 6, 6 so as to detect the displacement angle of the movable plate 5. In this respect, since the mutual inductance between the planar coil 7 and the detection coils 12A, 12B due to the detection current superimposed on the drive current to flow in the planar coil 7, changes with angular displacement of the movable plate 5, increasing with one of the detection coils approaching the movable plate 5, and reducing with the other separating from the movable plate 5, then the displacement angle of the movable plate 5 can be detected for example as a difference in fluctuations in a voltage signal output based on the mutual inductance.

The operation of the first embodiment will now be described.

A current is produced in the planar coil 7 with one of the electrical terminals 9 as a positive terminal and the other as a negative terminal. A magnetic field formed at both edges of the movable plate 5 by means of the permanent magnets 10A and 10B and the permanent magnets 11A and 11B, follows along planar faces of the movable plate 5 as shown by the arrow in FIG. 5, in a direction so as to intersect the planar coil 7. When a current flows in the planar coil 7 disposed within this magnetic field, a magnetic force F which can be determined from the Lorentz force, acts on the planar coil 7, in other words on the opposite ends of the movable plate 5, in a direction (as shown by the arrow in FIG. 5) according to Fleming's left hand rule for current, magnetic flux density and force, depending on the current density and the magnetic flux density of the planar coil 7.

This magnetic force F can be determined from the following equation (1);

$$F = i \times B \quad (1)$$

where i is the current density flowing in the planar coil 7, and B is the magnetic flux density due to the upper and lower permanent magnets.

Figure 5:
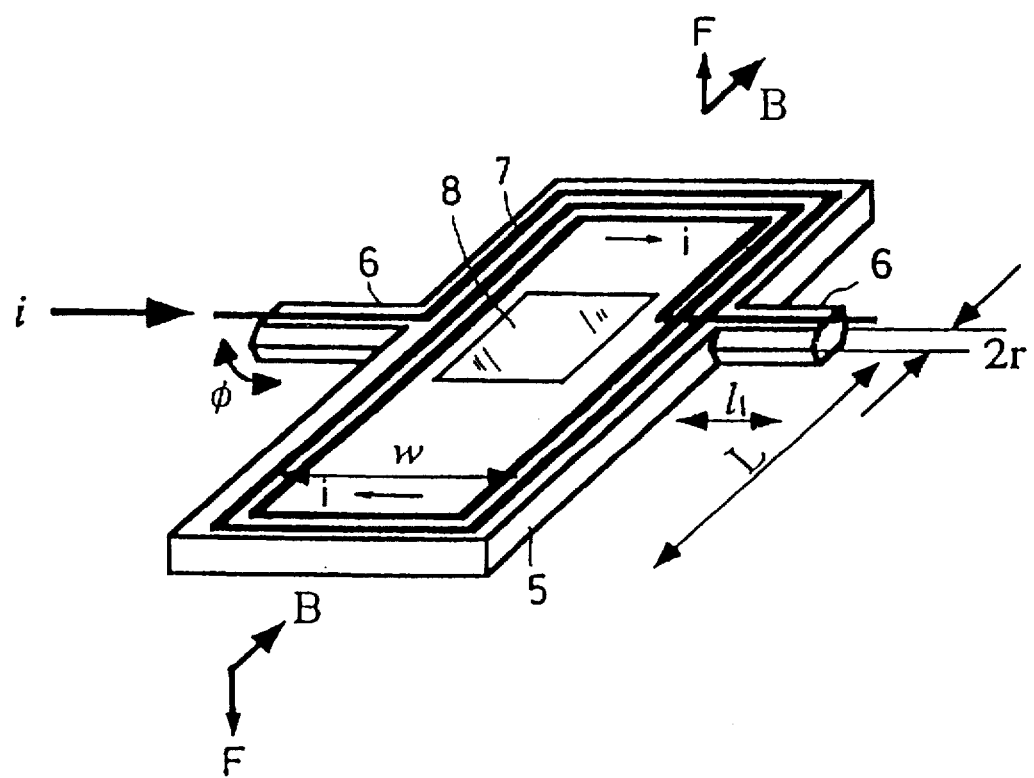
FIG. 5 is a diagram for explaining the operating theory of the mirror galvanometer of the first embodiment.

In practice, this force differs due to the number of windings n of the planar coil 7, and the coil length w (as shown in FIG. 5) over which the magnetic force F acts, so that the following equation (2) applies;

$$F = n \, w (i \times B) \quad (2)$$

The relationship between the displacement angle $\phi$ of the movable plate 5 and the resultant spring reactive force F' of the torsion bars 6, 6 when twisted with rotation of the movable plate 5, is given by the following equation (3);

$$\phi = (Mx/Glp) \quad (3)$$
$$= (FL/8.5 \times 10^9 r^4) \times l_1$$

where Mx is the torsional moment, G is the modulus of longitudinal elasticity, and lp is the polar moment of inertia of area. Moreover, L, $l_1$ and r are respectively, the distance from the torsion bar central axis to the load point, the torsion bar length, and the torsion bar radius as shown in FIG. 5.

The movable plate 5 rotates to a position wherein the magnetic force F is in equilibrium with the spring reactive force F'. Therefore, substituting F of equation 2 for F' in equation 3 shows that the displacement angle $\phi$ of the movable plate 5 is proportional to the current i flowing in the planar coil 7.

Since the displacement angle $\phi$ of the movable plate 5 can be controlled by controlling the current flowing in the planar coil 7, it thus becomes possible to freely control for example, the reflection direction of a laser beam incident on the total reflecting mirror 8, in a plane perpendicular to the axis of the torsion bars 6, 6. Therefore if the total reflecting mirror 8 is moved back and forth to continuously change the displacement angle, laser beam scanning can be achieved.

When controlling the displacement angle $\phi$ of the total reflecting mirror 8, a detection current for displacement angle detection of a frequency at least 100 times than of the drive current frequency (related to the drive frequency of the mirror 8) is superimposed on the drive current flowing in the planar coil 7. As a result, an induced voltage based on the detection current is generated in the respective detection coils 12A, 12B provided on the lower glass substrate 4 due to the mutual inductance between the planar coil 7 and detection coils 12A, 12B. When the movable plate 5, in other words the total reflecting mirror 8, is in a level condition, the induced voltages generated in the detection coils 12A, 12B become equal and hence the difference zero, since at this time the distances between the detection coils 12A, 12B and the corresponding portions of the planar coil 7 are equal. However when the movable plate 5 is rotated by the drive force about the torsion bars 6, 6, it approaches one of the detection coils 12A (or 12B) so that the induced voltage increases due to the increase in mutual inductance, and separates from the other of the detection coils 12B (or 12A) so that the induced voltage decreases due to the decrease in mutual inductance. Accordingly, the induced voltage generated in the detection coils 12A, 12B changes corresponding to the displacement of the total reflecting mirror 8, and the displacement angle $\phi$ of the total reflecting mirror 8 can thus be detected by detecting this induced voltage.

Figure 6:
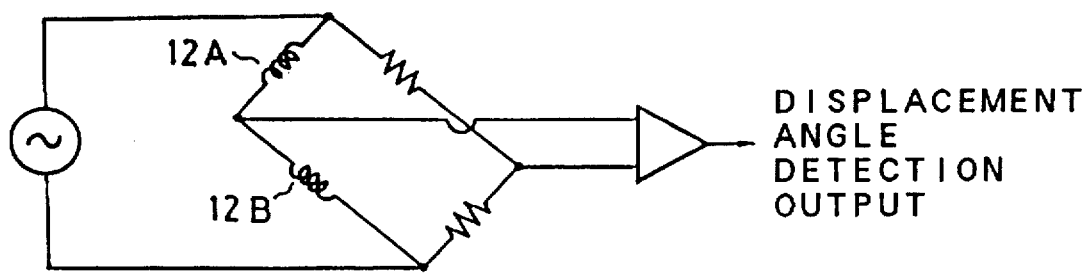
FIG. 6 is a circuit diagram showing an example of a circuit for detecting displacement based on an output from detection coils for the first embodiment.

The displacement angle $\phi$ of the total reflecting mirror 8 can be controlled accurately by using for example a circuit such as shown in FIG. 6 comprising a bridge circuit having two other resistances connected to the detection coils 12A, 12B connected to power source, with a differential amplifier into which is input the voltage between the central point of the detection coil 12A and the detection coil 12B, and the central point of the two resistances, with output of the differential amplifier corresponding to the voltage difference between the two central points, being fedback to the movable plate drive system to thus control the drive current.

Figure 7:
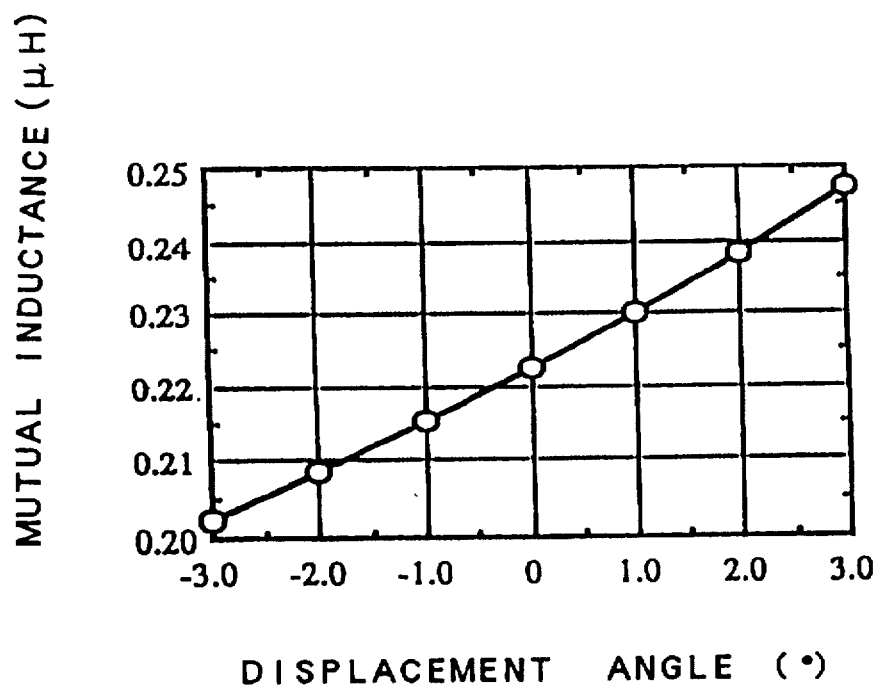
FIG. 7 is a graph showing an example of computational results of the relation between mutual inductance and displacement angle.

Computational results of the mutual inductance of one of the detection coils using the Neumann formula for mutual inductance are given in FIG. 7 for a movable plate size of 6 mm×6 mm, a detection coil area of 5 mm×5 mm, a distance between the movable plate and the detection coil of 250 microns, and the number of windings on the detection coils of 10 turns. The results in FIG. 7, are for up to three degrees displacement in mutually opposite directions, with the displacement angle for when the movable plate is level as zero.

From FIG. 7, the mutual inductance at zero degrees is 0.222 µH, at −3 degrees is 0.202 µH, and at +3 degrees is 0.247, giving a mutual inductance difference for ±3 degrees of 0.045 µH. Therefore, for a minimum resolution for the mirror of 0.1 degrees, it is necessary to detect 0.75 nH. Hence the mutual inductance detection value becomes extremely small. However, if the number of windings is increased for example to 20 turns, it is sufficient to detect around four times this amount, that is to say 3 nH. Therefore if the number of windings of the detection coil is appropriately set, the mirror displacement angle can be detected with sufficiently good accuracy.

The characteristics of the planar type mirror galvanometer of the present invention will now be described.

At first the magnetic flux density distribution due to the permanent magnets will be described.

Figure 8:
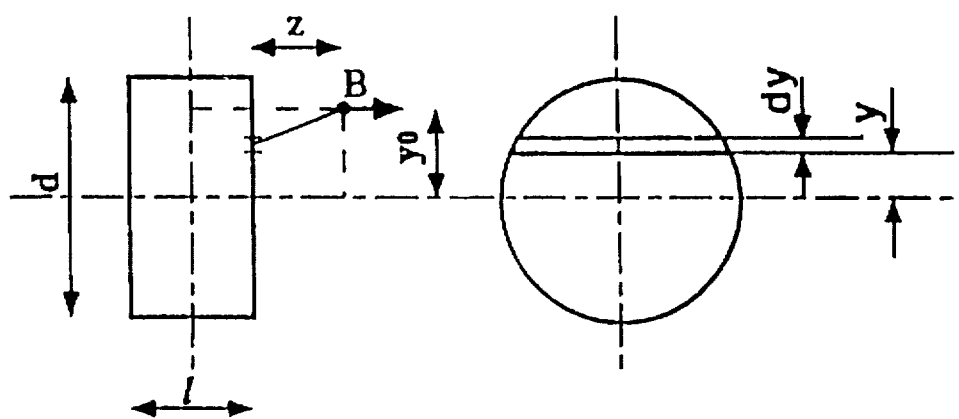
FIG. 8 is a computational model diagram for computing magnetic flux density distribution due to a permanent magnet.

FIG. 8 shows a magnetic flux density distribution computation model for the cylindrical shaped permanent magnets used in the first embodiment. Respective north and south pole faces of a permanent magnet are divided up into very small regions dy, and the magnetic flux density for the resultant points computed.

If the magnetic flux density produced at the north pole face is Bn and the magnetic flux density produced at the south pole face is Bs, the magnetic flux densities Bn, Bs can be obtained from the computational formula for the magnetic flux density distribution of a cylindrical shaped permanent magnet, according to equations (4) and (5). The magnetic flux density B at an optional point becomes the sum of Bn and Bs as given by equation (6):

$$Bn = -\frac{Br}{2\pi} \int_{-d/2}^{d/2} \frac{z[(d/2)^2 - y]^{1/2} dy}{[(y-yo)^2 + z^2][(d/2)^2 + z^2 + yo^2 - 2yoy]^{1/2}} \quad (4)$$

$$Bs = \quad (5)$$

$$\frac{Br}{2\pi} \int_{-d/2}^{d/2} \frac{(z+1)[(d/2)^2 - y^2]^{1/2} dy}{[(y-yo)^2 + (z+1)^2][(d/2)^2 + (z+1)^2 + yo^2 - 2yoy]^{1/2}}$$

$$B = Bn + Bs \quad (6)$$

Here in the respective equations (4) and (5), Br is the residual magnetic flux density of the permanent magnet, y, z are coordinates at an optional point in space in the vicinity of the permanent magnet, l is the distance between the north and south pole faces of the permanent magnet, and d is the diameter of the polar faces.

Figure 9:
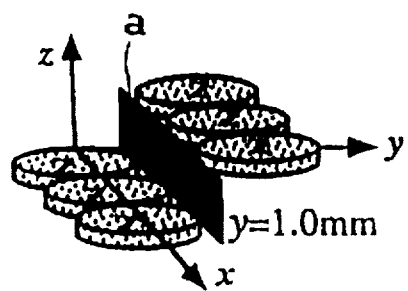
FIG. 9 is a diagram illustrating locations of the computed magnetic flux density distribution.
Figure 10:
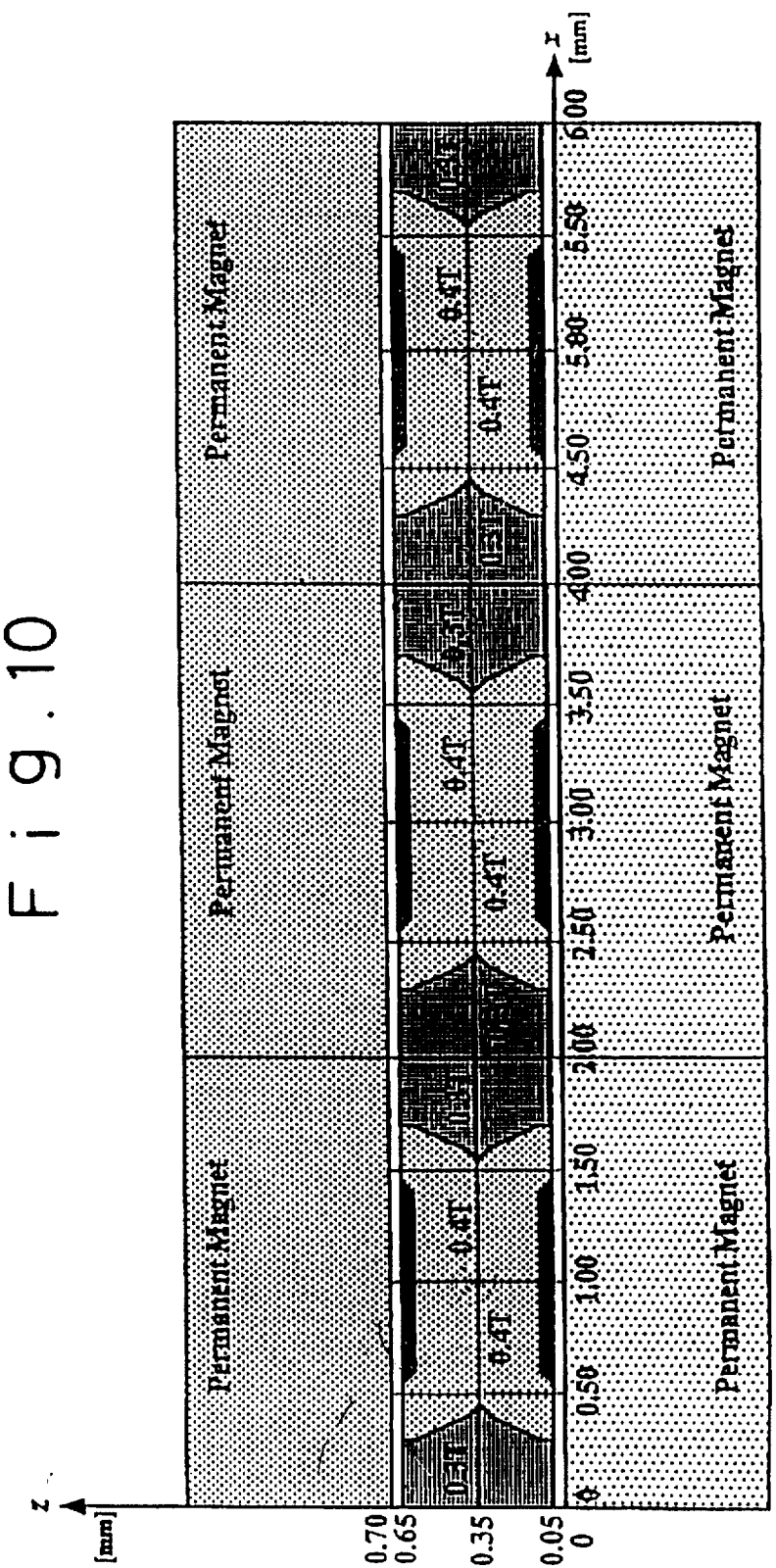
FIG. 10 is a diagram of computational results of magnetic flux density distribution at the locations shown in FIG. 9.

The computed results for the magnetic flux density distribution in a surface "a" arranged as shown in FIG. 9 perpendicular to the faces of the permanent magnets, are given in FIG. 10 for an example using a DIANET DM-18 (trade name; product of Seiko Electronics) Sm-CO permanent magnet of 1 mm radius, 1 mm thickness and a residual magnetic flux density of 0.85 T. In FIG. 5, x, y, z are coordinates at an optional point in space in the vicinity of the permanent magnet.

When arranged as shown in FIG. 9, the space between the magnets has a magnetic flux density of approximately 0.3 T or greater.

The displacement of the movable plate will now be described.

This is obtained for example from equations (2) and (3), with the width of the planar coil formed on the movable plate as 100 μm and the number of windings as 14, the width of the movable plate as 4 mm, the length as 5 mm, and the thickness as 20 μm, and the radius of the torsion bar as 25 microns and the length as 1 mm. For the magnetic flux density, the value of 0.3 T obtained from the beforementioned magnetic flux density distribution computation was used.

Figure 11A:
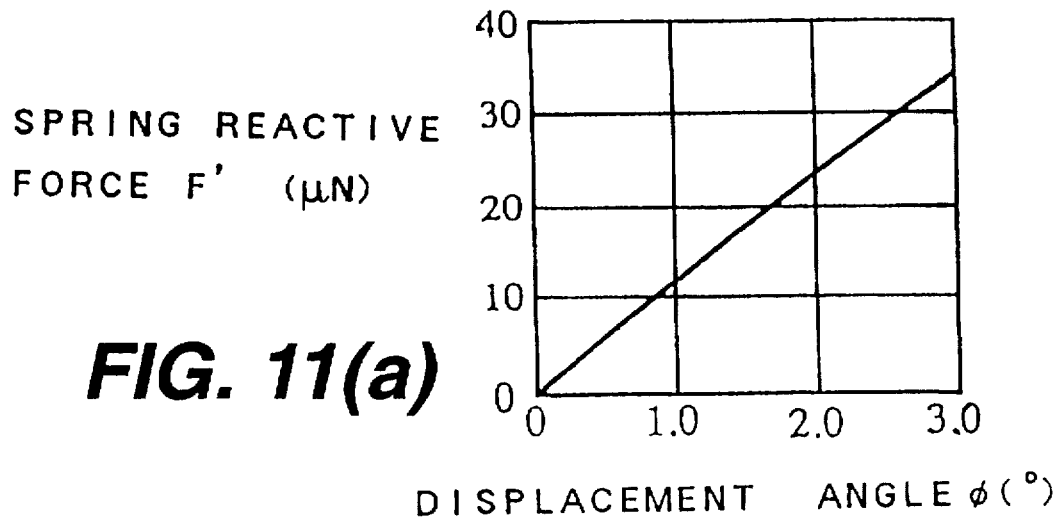
FIGS. 11(A)–(C) are graphs of computational results for movable plate displacement and electrical current.
Figure 11B:
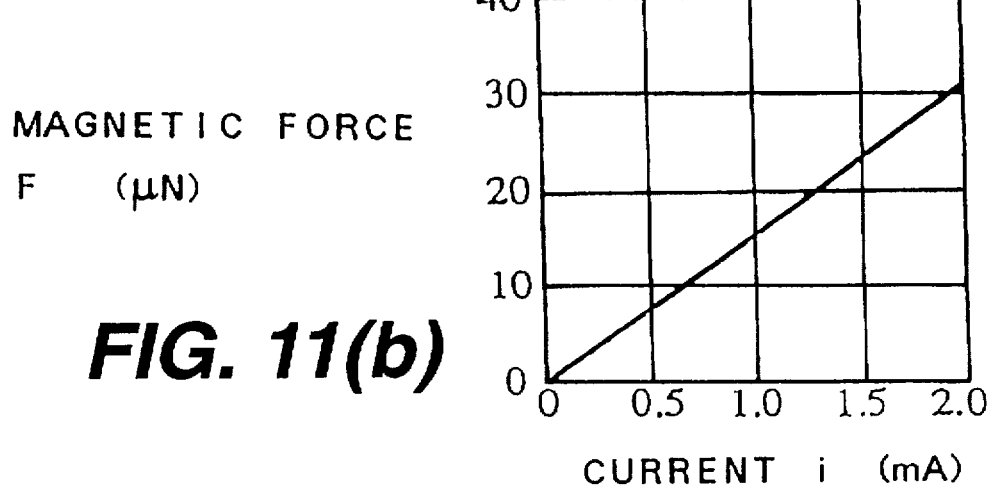
Figure 11C:
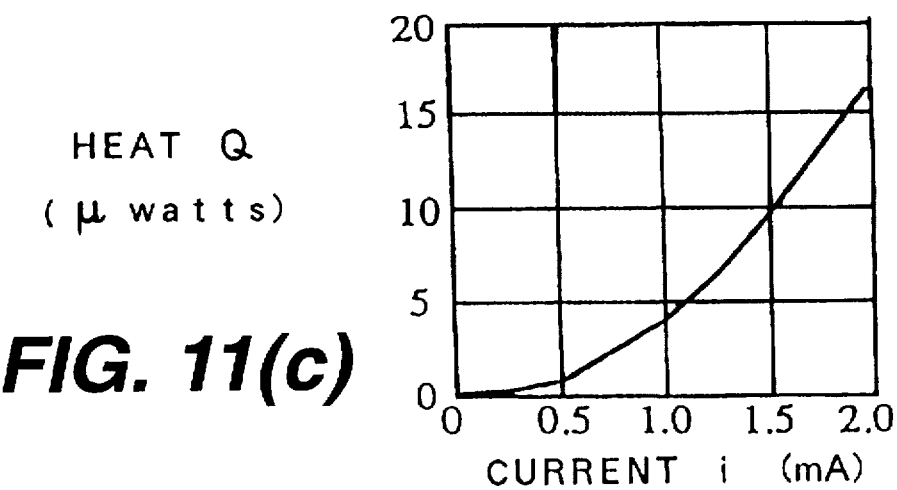

The result in graphs (A) and (B) of FIG. 11 shows that a current of 1.5 mA gives a two degrees displacement angle. FIG. 11(C) shows the relationship between current and the amount of heat Q generated. The amount of heat generated per unit area at this time is 13 μwatt/cm².

The relationship between the amount of heat generated and the amount lost will now be explained.

The amount of heat generated is the Joule heat generated by the resistance of the coil. Therefore the amount of heat Q generated per unit time can be expressed by the following equation (7);

$$Q = i^2 R \quad (7)$$

where i is the current flowing in the coil and R is the resistance of the coil.

The amount of heat lost Qc due to convection can be expressed by the following equation (8);

$$Qc = hS\Delta T \quad (8)$$

where h is the heat transfer coefficient ($5 \times 10^{-3} \sim 5 \times 10^{-2}$ watt/cm² °C. for air), S is the surface area of the element, and ΔT is the temperature difference between the element surface and the air.

If the surface area of the movable plate (heat generating portion) is 20 mm² (4 mm×5 mm) then equation (8) gives;

$$Qc = 1.0 \Delta T (m \text{ watt/°C.}) \quad (8)'$$

This shows that if the amount of heat generated is only several tens of watts/cm², problems with temperature rise of the element can be disregarded.

For a reference, the amount of heat lost Or due to radiation can be expressed by the following equation (9);

$$Qr = \epsilon\, S\, \sigma T^4 \quad (9)$$

where ε is the emissivity (for a black body ε=1, while generally ε<1), S is the surface area of the element, σ is the Stefan-Boltzmann constant ($\pi^2$ k⁴/60 h³c²), and T is the element surface temperature.

The amount of of heat lost Qa due to conduction from the torsion bar can be expressed by the following equation (10);

$$Qa = 2\lambda (S/l_1) \Delta T \quad (10)$$

where λ is the thermal conductivity (84 watts/mK for silicon), S is the cross sectional area of the torsion bar, $l_1$ is the length of the torsion bar, ΔT is the temperature difference between the ends of the torsion bar. If the radius of the torsion bar is 25 μm and the length is 1 mm, then equation (10) gives;

$$Qa = 0.1 \Delta T (m \text{ watt/°C.}) \quad (10)'$$

The bending of the torsion bar due to the weight of the movable plate, and the bending of the movable plate due to the electromagnetic force will now be explained.

Figure 12:
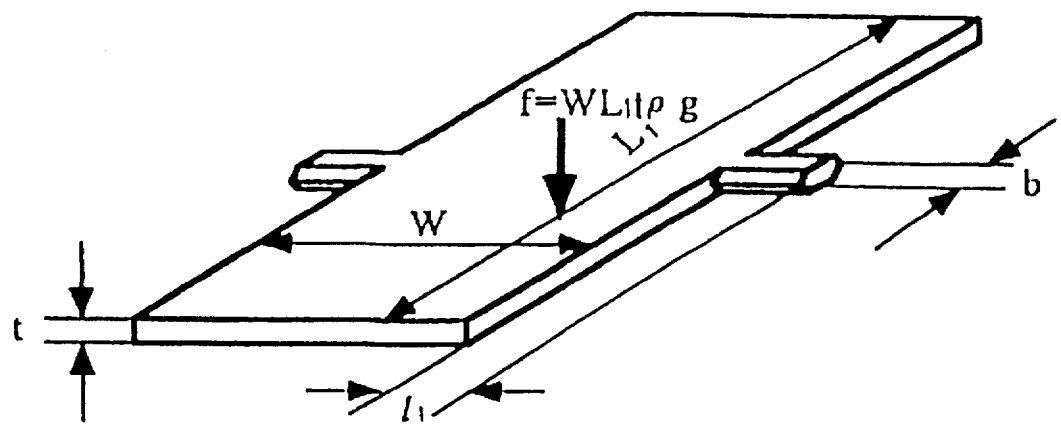
FIG. 12 is a computational model diagram for computing bending of the torsion bar and the movable plate.

FIG. 12 shows a computational model for this. With a torsion bar length of $l_1$, a torsion bar width of b, a movable plate weight of f, a movable plate thickness of t, a movable plate width of W, and a movable plate length of $L_1$, then using the computational method for the bending of a cantilever, the bending ΔY of the torsion bar is given by the following equation (11);

$$\Delta Y = (1/2)(4 l_1^3 f/E\, b\, t^3) \quad (11)$$

where E is the Young's modulus for silicon.

The weight f of the movable plate is given by the following equation (12);

$$f = W L_1 t \rho g \quad (12)$$

where ρ is the volumetric density and g is the gravitational acceleration.

The bending ΔX of the movable plate, using the same computational method for the bending of a cantilever, is given by the following equation (13);

$$\Delta X = 4(L1/2)^3\, F/E\, W\, t^3 \quad (13)$$

where F is the magnetic force acting on the edge of the movable plate. The magnetic force F is obtained by assuming the coil length w in equation (2) to be the width W of the movable plate.

The computational results for the bending of the torsion bar and the bending of the movable plate are given in Table 1. The bending of the movable plate is calculated for a magnetic force F of 30 μN.

TABLE 1

Computational Results for the Bending of the Torsion Bar and Movable Plate

| W  | 6 mm      | 6 mm      | 6 mm      |
|----|-----------|-----------|-----------|
| $L_1$ | 13 mm  | 13 mm     | 13 mm     |
| t  | 50 μm     | 50 μm     | 100 μm    |
| b  | 50 μm     | 50 μm     | 50 μm     |
| $l_1$ | 0.5 mm | 1.0 mm    | 1.0 mm    |
| f  | 89 μN     | 89 μN     | 178 μN    |
| ΔY | 0.022 μm  | 0.178 μm  | 0.356 μm  |
| ΔX | 0.125 μm  | 0.125 μm  | 0.016 μm  |

As can be seen from Table 1, with a torsion bar of width 50 μm and length 1 mm, the bending ΔY due to a movable plate of width 6 mm, length 13 mm, and thickness 50 μm is 0.178 μm. If the thickness of the movable plate is doubled to 100 μm, then the bending ΔY is still only 0.356 μm. Furthermore, with a movable plate of width 6 mm, length 13 mm, and thickness 50 μm, the bending ΔX due to magnetic force is only 0.125 μm. If the amount of displacement at opposite ends of the movable plate during operation is around 200 μm, then this small amount will have no influence on the characteristics of the planar type mirror galvanometer.

The influence on displacement of the total reflecting mirror due to the displacement angle detection current flowing in the planar coil for detecting the displacement angle, will now be explained.

The equation for torsional oscillation with a damping system, under a moment given by M(t)=M cos ω t, is as follows;

$$(d^2\phi/dt^2) + 2 Y(d\phi/dt) + \omega_o^2 \phi = (M/J) \cos \omega t \quad (14)$$

where 2 Y=c/J. Here φ is the displacement angle, J is the moment of inertia, c is the damping coefficient, and $\omega_o$ is the characteristic oscillation frequency. The characteristic oscillation frequency $\omega_o$ is given by;

$$\omega_o = (k/J)^{1/2} \quad (15)$$

where k is the spring constant expressed as:

$$k = (G \, Ip)/l_1 \quad (16)$$

where G and Ip are the beforementioned modulus of longitudinal elasticity, and the polar moment of inertia of area respectively, and $l_1$ is the length of the torsion bar. Equations 15 and 16 give;

$$\omega_o = (G \, Ip/J \, l_1)^{1/2} \quad (17)$$

The moment of inertia J, and the polar moment of inertia of area Ip can be expressed as;

$$J = [M(t^2 + L_1^2)]/12 \quad (18)$$

$$Ip = \pi r^4/32 \quad (19)$$

where M is the movable plate mass, t is the movable plate thickness, $L_1$ is the movable plate length, and r is the radius of the torsion bar.

The characteristic frequency o() can thus be computed from equations (17) through (19).

With A as the amplitude, that is to say the magnitude of the displacement angle of the movable plate, then equation (14) gives;

$$A = (M/J) [1/\{(\omega_o^2 - \omega^2)^2 + 4 Y^2 \omega^2\}^{1/2}] \quad (20)$$

Here if the frequency $\omega_s$ used for detection is $n\omega_o$, and the frequency $\omega_d$ for mirror drive is $(1/n) \omega_o$ (where n is (frequency of the detection current/frequency of the drive current)>1), then taking the ratio of the sizes of the respective displacement angles As, Ad gives;

$$\frac{As}{Ad} = \frac{[(1-(1-(1/n^2))^2\omega_o^2 + 4(1/n)^2\gamma^2\omega^2]^{1/2}}{[(n^2-1)^2\omega_o^2 + 4n^2\gamma^2\omega^2]^{1/2}} \quad (21)$$

From this result, it is found that the influence on the mirror due to an electric current of a frequency used for displacement detection, becomes $1/n^2$ times the displacement due to the drive current frequency, irrespective of damping. Accordingly, if the detection current frequency is for example equal to or more than 100 times that of the drive current frequency, that is to say, n=100 or more, then As/Ad becomes equal to or less than 1/10,000, so that even with the detection current superimposed on the drive current in the planar coil, the mirror displacement can be detected with practically no influence on the mirror drive.

The case wherein the characteristic frequency is used for the drive frequency will now be investigated. With the frequency $\omega_s$ used for detection as $n^2\omega_o$, and the frequency $\omega_d$ for mirror drive as $\omega_o$, then taking the ratio of the sizes of the respective displacement angles As, Ad gives the following equation (22);

$$\frac{As}{Ad} = \frac{[4\gamma^2\omega^2]^{1/2}}{[(n^4-1)^2\omega_o^2 + 4n^4\gamma^2\omega^2]^{1/2}} \quad (22)$$

$$= [(4\gamma^4)/((n^4-1)^2 + 4n^4\gamma^2)]^{1/2}$$

Making Y the square root in equation (22) to obtain a relation between Y and Y, gives the following equation (23);

$$Y = \frac{1}{n^4} - \frac{(n^4-1)^2/n^4}{(n^4-1)^2 + 4n^4\gamma^2} \quad (23)$$

Figure 13:
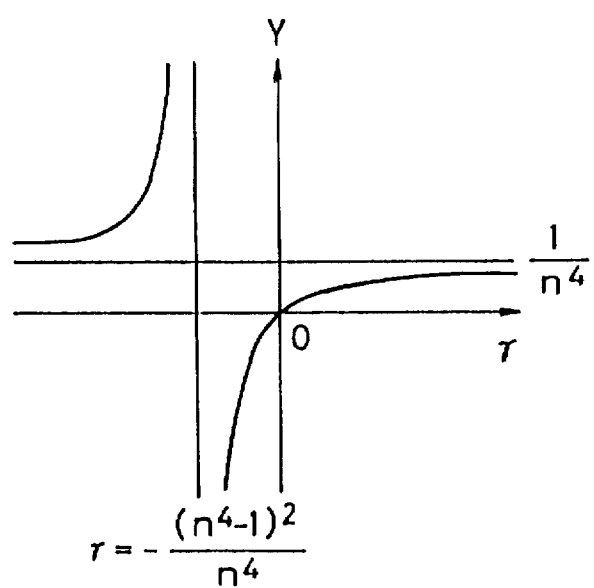
FIG. 13 is a graph for illustrating the influence that displacement angle detection current has on mirror displacement.

A plot of the relation between Y and Y in equation (23) is shown in FIG. 13.

From FIG. 13 it is seen that in the range where Y>0, there is a gradual increase from 0 to $1/n^4$. This shows that the ratio of the sizes of the displacement angles As, Ad (=As/Ad) is smaller than $1/n^2$. Therefore if the drive frequency is made the characteristic frequency, then the following two characteristics are apparent; (1) the frequency of the current for detecting displacement angle will have a smaller influence on the mirror than when the drive frequency is smaller than the characteristic frequency, and (2) the frequency of the current for detecting displacement angle will have no influence on the mirror when there is no damping.

As described above, with the planar type mirror galvanometer 1, influence due to heat generated by the coil can also be disregarded. Moreover, since the swing characteristics of the movable plate 5 present no problems, then functions the same as with conventional devices can be realized. Furthermore, by using a semiconductor element manufacturing process, then an ultra small slim-model mirror galvanometer can be made. Consequently, miniaturization of laser beam scanning systems using a mirror galvanometer becomes possible, enabling miniaturization of laser adapted equipment which use such scanning systems. Additionally, through using a semiconductor element manufacturing process, mass production becomes possible. Moreover, since a detection current of a predetermined frequency is superimposed on the drive current in the planar coil 7, and the pair of detection coils 12A, 12B electromagnetically coupled to the planar coil 7 are arranged on the lower glass substrate 4 so that the displacement angle of the movable plate 5, that is to say the total reflecting mirror 8 can be detected by detecting the change in mutual inductance between the planar coil 7 and the detection coils 12A, 12B corresponding to the displacement of the movable plate 5, then the displacement angle of the mirror can be accurately detected, enabling an improvement in the accuracy of controlling the displacement angle. Furthermore, the mirror displacement angle detection function can be easily added, since it is not necessary to modify the construction of the movable plate 5, the detection coils 12A, 12B being merely located on the lower glass substrate 4, without the addition of new structure to the movable plate 5. Manufacture is therefore simple.

With the present embodiment, a permanent magnet is used to produce the magnetic field, however an electromagnet may also be used. Furthermore, while the construction involves a glass substrate provided above and below the silicon substrate for fixing the magnets, if the magnets can be fixed at a predetermined location, the glass substrate becomes unnecessary.

Figure 14:
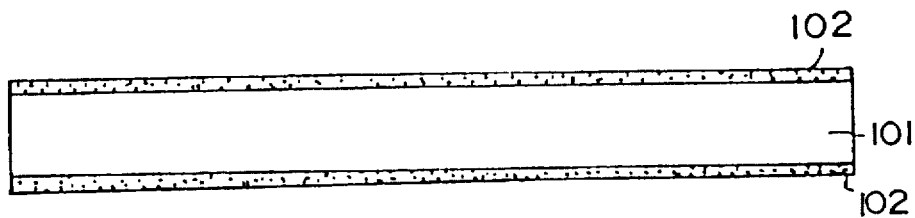
FIGS. 14(a)–(l) are diagrams for explaining the manufacturing steps of the mirror galvanometer of the first embodiment.
Figure 14B:
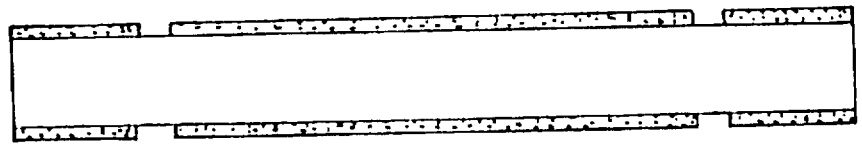
Figure 14C:
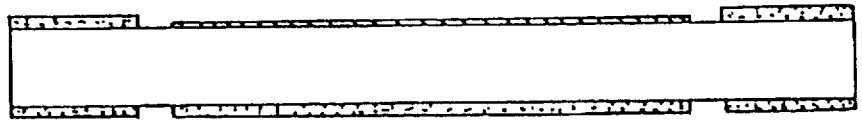
Figure 14D:
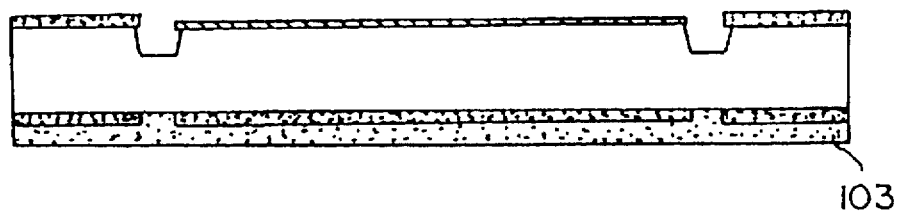
Figure 14E:
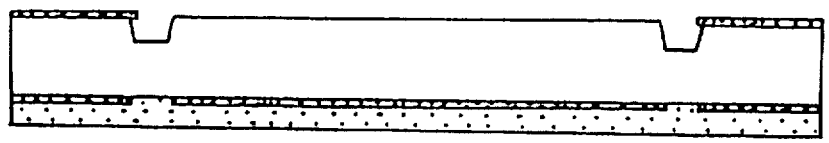
Figure 14F:
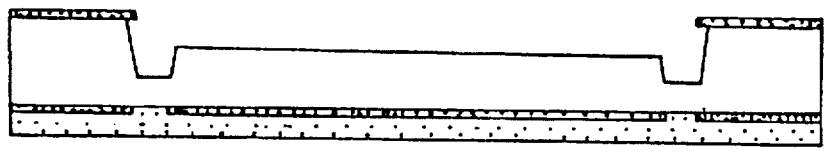
Figure 14G:
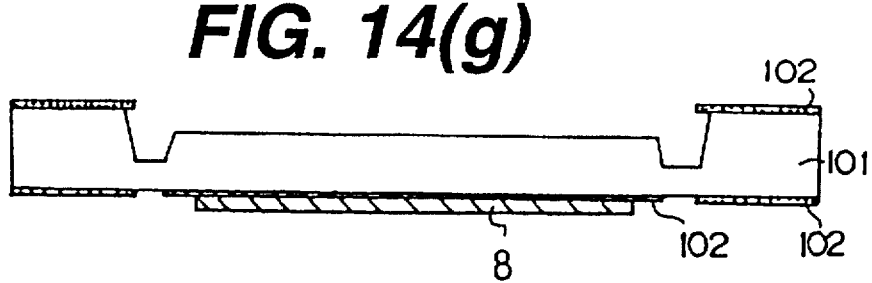
Figure 14H:
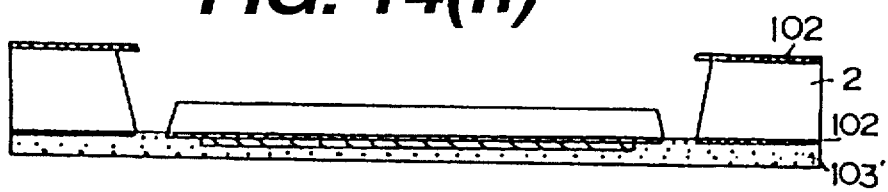
Figure 14I:
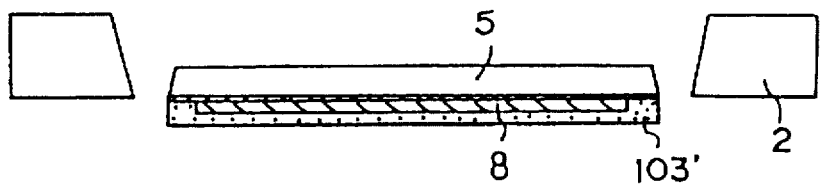
Figure 14J:
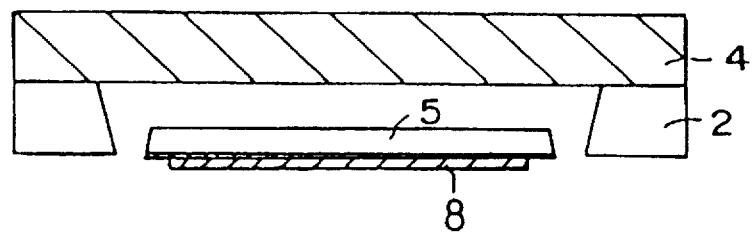
Figure 14K:
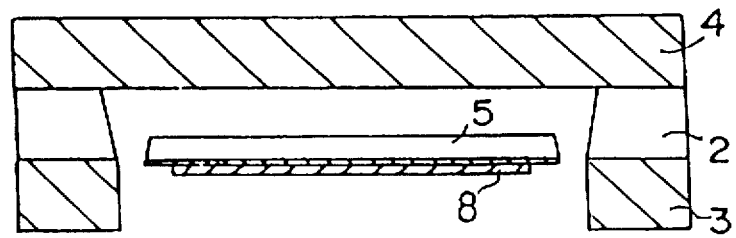
Figure 14L:
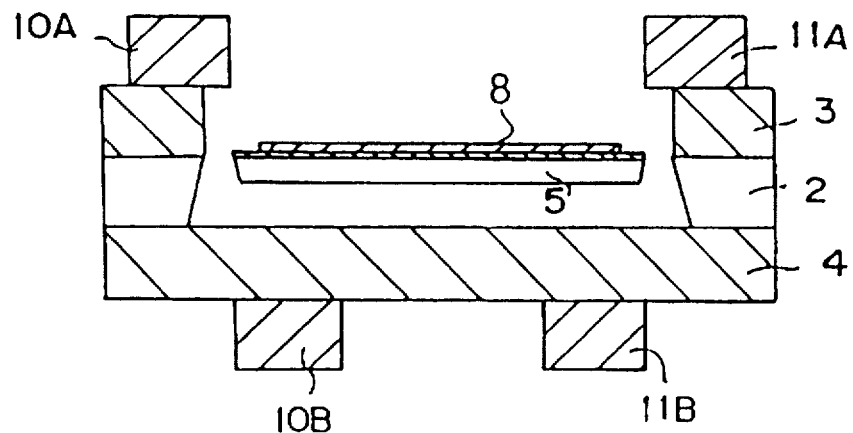

The steps in the manufacture of the mirror galvanometer according to the first embodiment will now be described with reference to FIG. 14.

The upper and lower faces of a 300 μm thick silicon substrate 101 are first thermally oxidized to form an oxide film (1 μm) 102 (see FIG. (a)).

Cut-out patterns are then formed on the front and rear faces by photolithography, and the oxide film on the cut-out portion removed by etching (see FIG. (b)). After this, the oxide film on the portion forming the movable plate is removed down to a thickness of 0.5 μm (see FIG. (c)).

A wax layer 103 is then applied to the front face (lower face in FIG. 14), and anisotropic etching carried out on the rear face cut-out portion by 100 microns (see FIG. (d)).

After this, the thin oxide film on the movable plate portion on the rear face is removed (see FIG. (e)), and anisotropic etching carried out on the cut-out portion, and the movable plate portion by 100 microns (see FIG. (f)).

The wax layer 103 on the front face is then removed, and the planar coil and the electrode terminal portions (not shown in the figure) are formed on the front face oxide film 102 by a conventional coil electroforming method. Additionally, a total reflecting mirror 8 is formed by vapor deposition of aluminum (see FIG. (g)). The coil electroforming method involves forming a nickel layer on the front face of the silicon substrate 101 by nickel sputtering, then forming a copper layer by electroplating or sputtering. The portions corresponding to the planar coil and the electrode terminals are then masked with a positive type resist, and copper etching and nickel etching successively carried out, after which the resist is removed. Copper electroplating is then carried out so that the whole peripheral edge of the nickel layer is covered with copper, thus forming a copper layer corresponding to the planar coil and the electrode terminals. After this, a negative type plating resist is coated on the areas except the copper layer, and copper electroplating carried out to thicken the copper layer to form the planar coil and the electrode terminals. The planar coil portion is then covered with an insulating layer of for example a photosensitive polyimide and the like. When the planar coil is in two layers, the process can be repeated again from the nickel sputtering step to that of forming the insulating layer.

A wax layer 103' is then provided on the front surface, and anisotropic etching carried out on the cut-out and movable plate portions by a 100 microns to cut through the cut-out portion. The wax layer 103' is then removed except for on the movable plate portion. At this time, the upper and lower oxide films 102 are also removed. In this way, the movable plate 5 and the torsion bar (not shown in the figure) are formed, thus forming the silicon substrate 2 of FIG. 3 (see FIGS. (h) and (i))

The wax layer 103' on the movable plate portion is then removed, and the upper glass substrate 3 and the lower glass substrate 4 incorporating the detection coils 12A, 12B (not shown in the figure), respectively joined to the upper and lower faces of the silicon substrate 2 by anodic splicing (see FIGS. (j) and (k)). The detection coils 12A, 12B are formed beforehand at predetermined locations on the lower glass substrate 4 prior to carrying out the anodic splicing, on the side opposite to the contact surface side. The detection coils are made by forming a metal layer over the whole of the formation surface of the lower glass substrate 4 by sputtering a metal having good conductivity such as nickel or copper. The portion corresponding to the detection coils is then masked, and the remaining metal layer removed by etching.

Finally the permanent magnets 10A, 10B and 11A, 11B are mounted at predetermined locations on the upper and lower glass substrates 3, 4 (see FIG. (l).

By manufacturing in this manner using a semiconductor manufacturing process, mass production of the planar type mirror galvanometer incorporating a mirror displacement detection function which utilizes mutual inductance becomes possible.

A second embodiment of a planar type mirror galvanometer according to the present invention will now be described with reference to FIG. 15. The mirror galvanometer of the first embodiment was for one dimensional scanning of, for example, a laser beam. The second embodiment however is an example of a two axis mirror galvanometer, having two torsion bars perpendicular to each other to enable two dimensional scanning, and thus increase the scanning range compared to that for one dimensional scanning of, for example, a laser beam. Elements the same as in the first embodiment are indicated with the same symbol.

Figure 15:
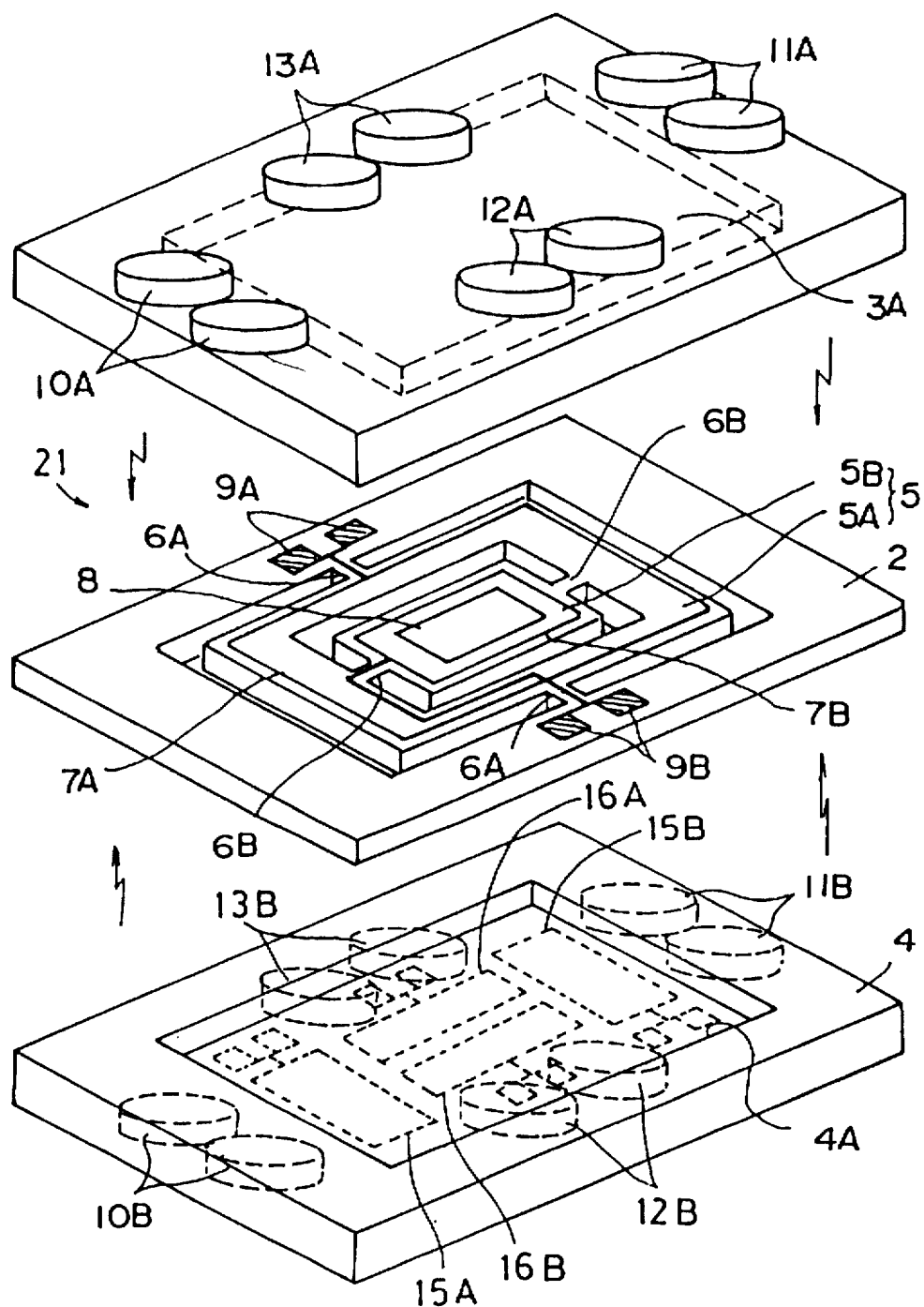
FIG. 15 is a perspective view showing the construction of a second embodiment of a mirror galvanometer according to the present invention.
Figure 16A:
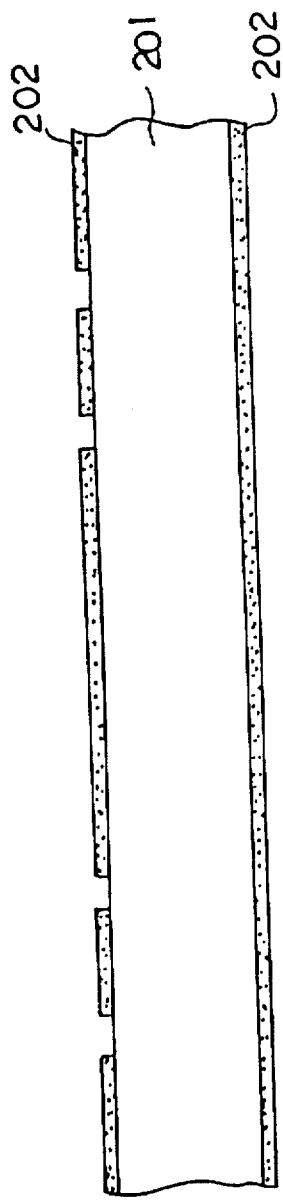
FIGS. 16(a)–(l) are diagrams for explaining the manufacturing steps of the mirror galvanometer of the second embodiment.
Figure 16B:
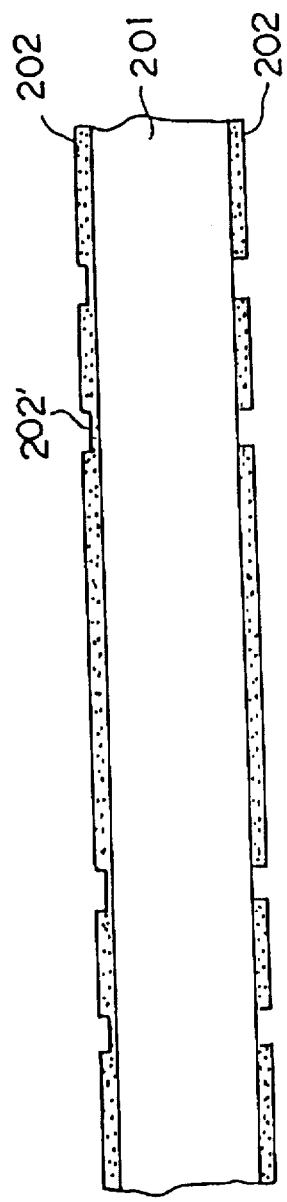
Figure 16C:
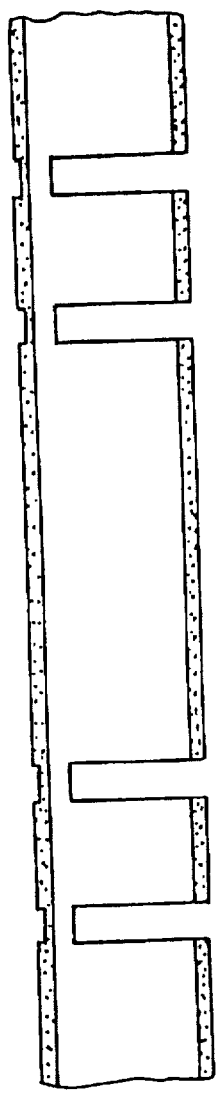
Figure 16D:
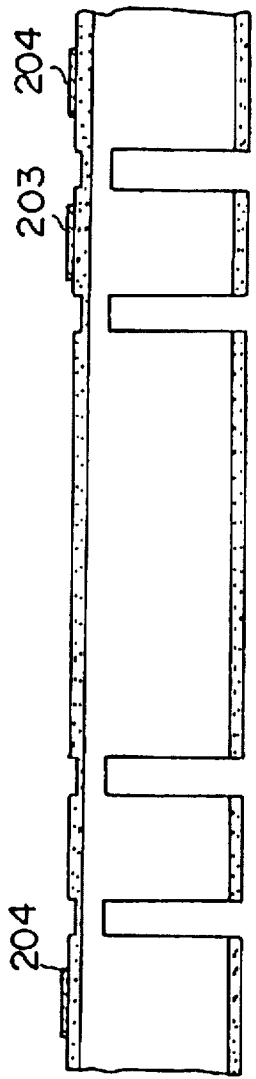
Figure 16E:
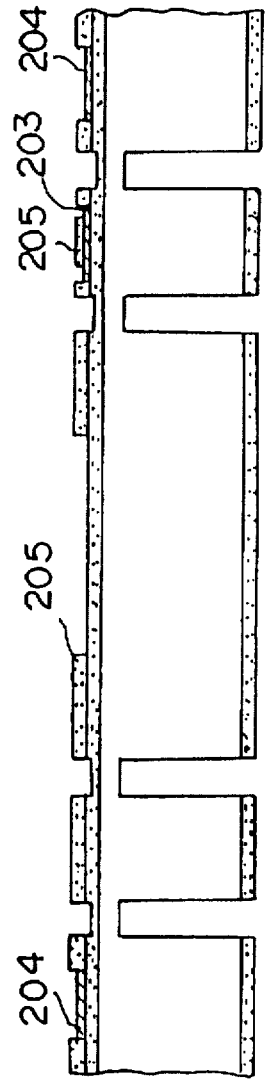
Figure 16F:
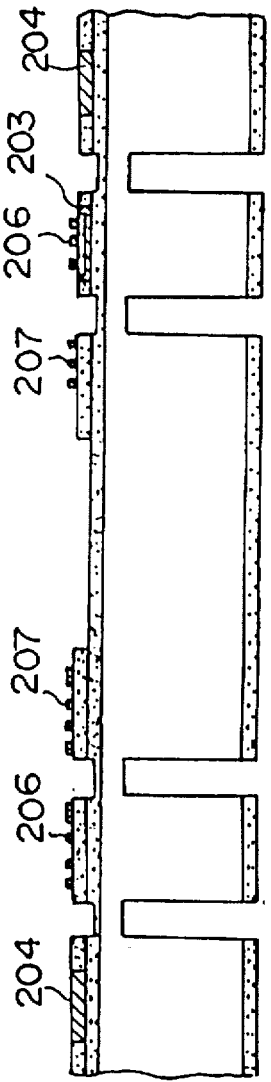
Figure 16G:
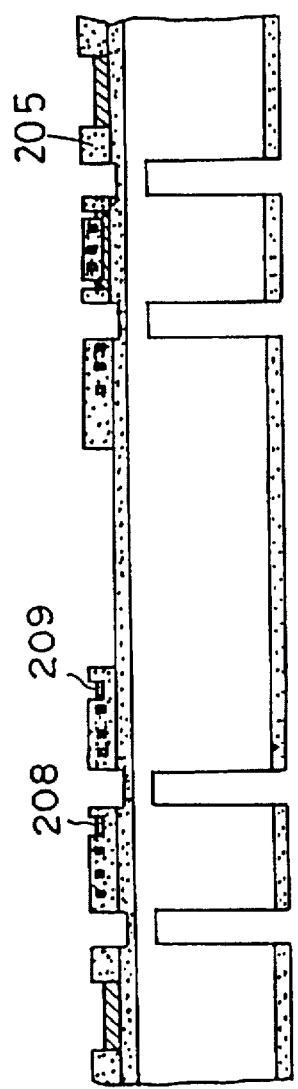
Figure 16H:
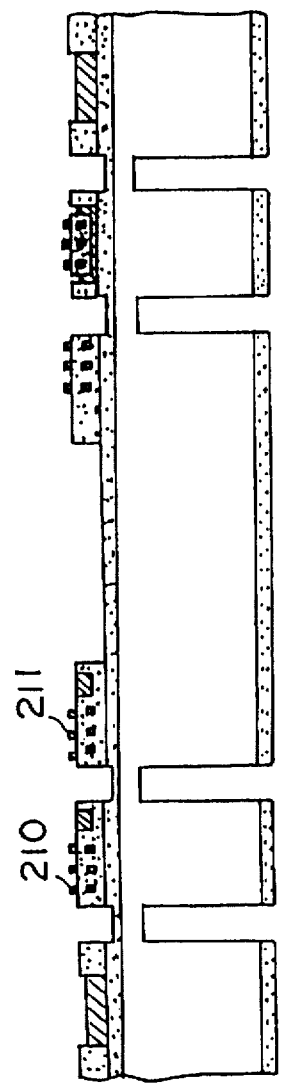
Figure 16I:
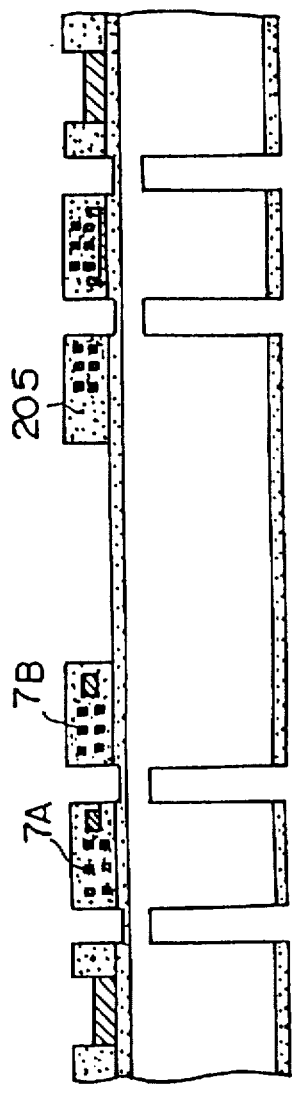
Figures 16J, 16K, 16L:
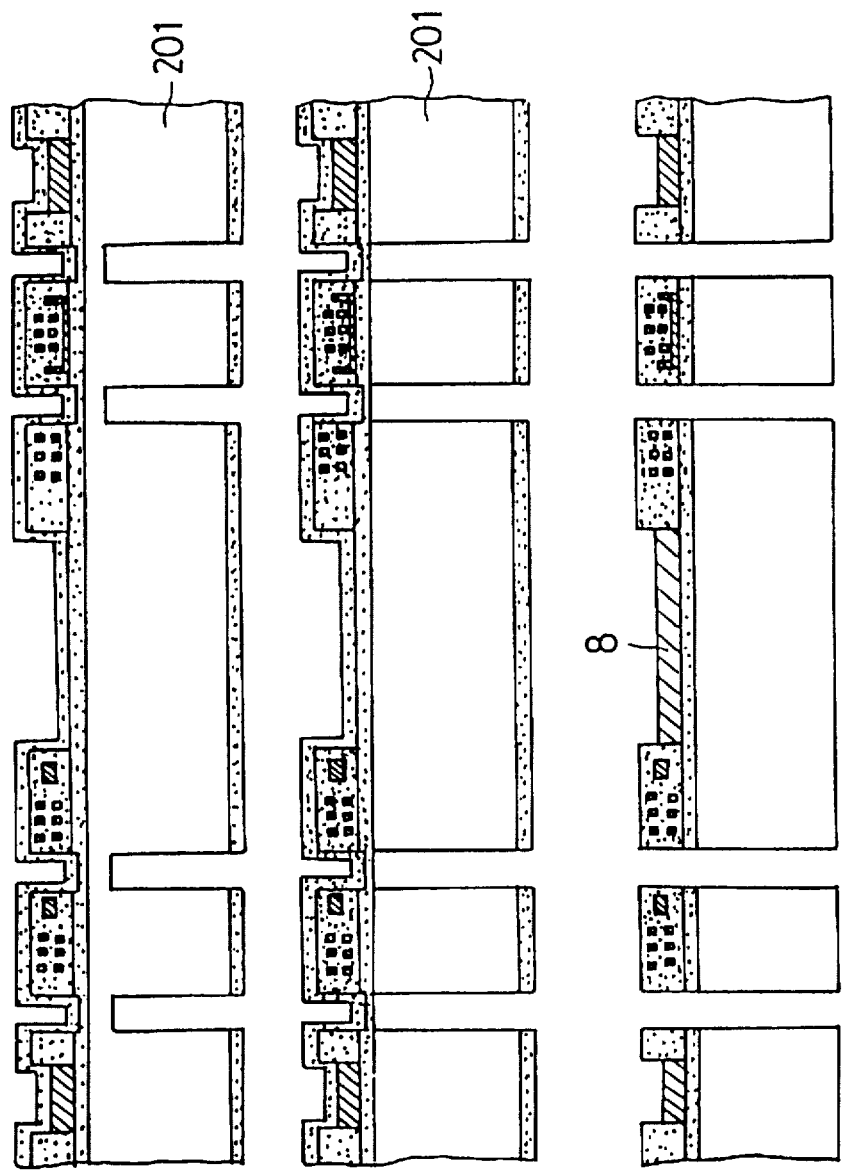

In FIG. 15, a mirror galvanometer 21 of the second embodiment, is of a three layer construction with upper and lower glass substrates 3, 4 (upper and lower insulating substrates) made for example from borosilicate glass or the like, respectively overlaid as shown by the arrows on the upper and lower faces of the silicon substrate 2 (semiconductor substrate) and anodic spliced thereto. As shown in FIG. 15, the upper and lower glass substrates 3, 4 are provided with rectangular shaped recesses 3A, 4A formed in respective central portions, for example by ultrasonic machining. When anodic splicing to the silicon substrate 2, the upper glass substrate 3 is positioned on the silicon substrate 2 with the recess 3A on the lower side, and joined, while the lower glass substrate 4 is similarly positioned on the silicon substrate 2 with the recess 4A on the upper side, and joined. As a result the swinging space for the movable plate 5 which is provided with a total reflecting mirror 8, is maintained and is also formed as an air tight construction. When the upper and lower glass substrates 3, 4 are joined to the silicon substrate 2, if a bonding agent is used there is the possibility of gas infiltrating into the swinging space for the movable plate. However if as with the present embodiment, anodic splicing is used, then this problem does not arise.

The silicon substrate 2 is provided with a planar movable plate 5 comprising a frame shaped outer movable plate 5A and an inner movable plate 5B axially supported inside the outer movable plate 5A. The outer movable plate 5A is axially supported on the silicon substrate 2 by first torsion bars 6A, 6A, while the inner movable plate 5B is axially supported inside the outer movable plate 5A by second torsion bars 6B, 6B which are axially perpendicular to the first torsion bars 6A, 6A. The movable plate 5 and the first and second torsion bars 6A, 6B are formed integrally with the silicon substrate 2 by anisotropic etching, and are therefore made from the same material as the silicon substrate.

A planar coil 7A (shown typically as a single line in FIG. 15, but in actuality being a plurality of windings on the movable plate) covered with an insulating layer, is provided on an upper face of the outer movable plate 5A, with both ends electrically connected respectively to a pair of outer electrode terminals 9A, 9A formed on the upper face of the silicon substrate 2, by way of part of one of the first torsion bars 6A. Moreover, a planar coil 7B (shown typically as a single line in FIG. 15, but in actuality as with the outer movable plate, being a plurality of windings on the movable plate) covered with an insulating layer, is provided on the upper face of the inner movable plate 5B with both ends electrically connected respectively to a pair of inner electrode terminals 9B, 9B formed on the upper face of the silicon substrate 2, by way of part of the other of the first torsion bars 6A, passing from one of the second torsion bars 6B via the outer movable plate 5A portion. These planar coils 7A, 7B are formed as with the first embodiment, by the beforementioned heretofore known coil electroforming method using electroplating. The outer and inner electrode terminals 9A, 9B are formed on the silicon substrate 2 at the same time as forming the planar coils 7A, 7B, by the coil electroforming method. A total reflecting mirror 8 (reflecting mirror) is formed for example by vapor deposition of aluminum on a central portion of the inner movable plate 5B which is surrounded by the planar coil 7B.

Eight pairs of cylindrical shaped permanent magnets 10A–13A, and 10B–13B are respectively located in twos on the upper and lower glass substrates 3, 4 as shown in FIG. 15. The permanent magnets 10A, 11A, mutually opposed on the upper glass substrate 3, are for producing a magnetic field with the permanent magnets 10B, 11B on the lower glass substrate 4, at the planar coil 7A of the outer movable plate 5A, which interacts with the drive current in the planar coil 7A to rotatingly drive the outer movable plate 5A. Moreover, the permanent magnets 12A, 13A, mutually opposed on the upper glass substrate 3, are for producing a magnetic field with the permanent magnets 12B, 13B on the lower glass substrate 4, at the planar coil 7B of the inner movable plate 5B, which interacts with the drive current in the planar coil 7B to rotatingly drive the inner movable plate 5B. The construction is such that the mutually opposed permanent magnets 10A, 11A, have upper and lower polarities opposite to each other. That is to say when for example the upper face of the permanent magnet 10A is a south pole, the upper face of the permanent magnet 11A is a north pole. Furthermore, they are arranged so that their magnetic flux intersect perpendicular to the plane of the planar coil portion on the movable plate 5. The other mutually opposed permanent magnets 12A, 13A, permanent magnets 10B, 11B, and permanent magnets 12B, 13B are similarly arranged. Moreover the relationship between the vertically corresponding permanent magnets 10A, 10B, is such that the upper and lower polarity is the same. That is to say when for example the upper face of the permanent magnet 10A is a south pole, the upper face of the permanent magnet 10B is a south pole. The relationship between the other vertically corresponding permanent magnets 11A, 11B, permanent magnets 12A, 12B, and permanent magnets 13A, 13B is similar. As a result, the magnetic forces act on opposite sides of the movable plate 5 in mutually opposite directions.

The detection coils 15A, 15B, and 16A, 16B located so as to be capable of electromagnetic coupling with the beforementioned respective planar coils 7A, 7B are patterned onto the lower face of the lower glass substrate 4. The detection coils 15A, 15B are disposed at symmetrical locations with respect to the first torsion bar 6A, while the detection coils 16A, 16B are disposed at symmetrical locations with respect to the second torsion bar 6B, thus forming respective pairs. The pair of detection coils 15A, 15B are for detecting the displacement angle of the outer movable plate 5A. In this respect, the mutual inductance between the planar coil 7A and the detection coils 15A, 15B based on the detection current superimposed on the drive current flowing in the planar coil 7A, changes with angular displacement of the outer movable plate 5A, and a voltage signal corresponding to this change is output. The displacement angle of the outer movable plate 5A can thus be detected from this voltage signal. The pair of detection coils 16A, 16B are for similarly detecting the displacement angle of the inner movable plate 5B The operation will now be described.

If a current is passed through the planar coil 7A of the outer movable plate 5A, then the outer movable plate 5A rotates corresponding to the current direction, with the first torsion bars 6A, 6A as the supporting point. At this time, the inner movable plate 5B also moves as one with the outer movable plate 5A. In this case, the total reflecting mirror 8 moves in the same manner as for the first embodiment. On the other hand, if a current is passed through the planar coil 7B of the inner movable plate 5B, the inner movable plate 5B rotates relative to the outer movable plate 5A in a direction perpendicular to the rotation direction of the outer movable plate 5A, with the second torsion bars 6B, 6B as the supporting point.

Consequently, if the drive current in the planar coil 7A is controlled for example to operate the outer movable plate 5A for a single period rotation, and the drive current in the planar coil 7B is then controlled so that the inner movable plate 5B is displaced through a set angle, and this operation repeated periodically, then deflection scanning of incident laser light reflected from the total reflecting mirror 8 can be carried out in two dimensions.

When as with the second embodiment, there is glass above the total reflecting mirror 8, then the glass surface through the which laser light passes may be covered for example with a reflection preventing film.

If a detection current is superimposed on the respective drive currents flowing in the planar coils 7A, and 7B, then the displacement of the outer movable plate 5A can be detected by the differential output of the detection coils 15A, 15B, and the displacement of the inner movable plate 5B can be detected by the differential output of the detection coils 16A, 16B, by means of a circuit such as that of FIG. 6, according to the same theory as for the first embodiment, due to the mutual inductance between the detection coils 15A, 15B and the planar coil 7A, and between the detection coils 16A, 16B and the planar coil 7B. If this differential output is fedback to the respective drive systems for the outer movable plate 5A, and the inner movable plate 5B, then the displacement of the outer movable plate 5A, and the inner movable plate 5B can be accurately controlled. Needless to say, with the two axis mirror galvanometer of this embodiment, two circuits the same as that of FIG. 6 are provided, one for outer movable plate displacement detection and one for inner movable plate displacement detection.

With the mirror galvanometer 21 of the construction of the second embodiment, in addition to the similar effect to the first embodiment, laser beam deflection scanning with the total reflecting mirror 8 can be carried out in two dimensions, giving an increase in the degrees of freedom of scanning a laser beam, so that the scanning region can be increased compared to that for the single axis arrangement of the first embodiment. Moreover, since the swinging space for the movable plate 5 is sealed by the upper and lower glass substrates 3, 4 and the surrounding silicon substrate 2, the sealed space can be evacuated. As a result, the air resistance to rotation of the movable plate 5 can be eliminated, with the effect of an increase in the responsiveness of the movable plate 5.

Furthermore, when the drive current for the planar coil 7 is made large to give a large displacement setting for the movable plate 5, then instead of evacuating the sealed swinging space, an inert gas such as helium or argon may be introduced, in particular helium which has good heat conductivity. More specifically, if the current in the planar coil 7 is large, the amount of heat generated from the planar coil 7 will be large, so that in the case of a vacuum around the movable plate, heat dissipation from the movable plate will be poor. Therefore by introducing an inert gas the heat dissipation from the movable plate 5 can be increased compared to the situation with a vacuum, so that the influence of heating can be reduced. By introducing the inert gas, the responsiveness of the movable plate 5 will be somewhat reduced compared to the situation with a vacuum.

Of course with the single axis mirror galvanometer of the first embodiment also, a glass substrate formed with a recess similar to that of the second embodiment, may be used to seal the movable plate region.

The steps in the manufacture for the mirror galvanometer according the second embodiment will now be described with reference to FIG. 16.

The upper and lower faces of a silicon substrate 201 with a typical thickness of approximately 200 μm are first thermally oxidized to form an oxide film (0.5 μm) 202. A predetermined cut-out pattern is then formed on the front face (upper face in FIG. 16) by photolithography, and the oxide film in the cut-out portion removed by etching (see FIG. (a)).

After this, the front face is thermally oxidized, and a thin oxide film (0.1 μm) 202' is formed on the cut-out portion, while a cut-out pattern is formed on the rear face (lower face in FIG. 16) at a location corresponding to the pattern on the front face, by photolithography (see FIG. (b)).

Anisotropic etching is then carried out on the cut-out portion on the rear face by 170 μm (see to FIG. (c)).

Then nickel sputtering is carried out on the front face to form a nickel layer, followed by copper sputtering to form a copper layer. The portion corresponding to an intersection portion 203 where the planar coil on the inner movable plate and the planar coil on the outer movable plate intersect without contact to connect to the electrode terminals, and the portions corresponding to the electrode terminals 204 on the silicon substrate beside the movable plate 5, are then masked with a positive type resist, and copper etching and nickel etching successively carried out. In this way, the intersection portion 203 and the electrode terminals 204 are formed on the silicon substrate face, from a nickel layer and copper layer (see FIG. (d)).

A mask is then applied except for opposite edge portions of the intersection portion 203, and the electrode terminal 204 portion, to form an insulating layer 205 of a photosensitive polyimide and the like (see FIG. (e)).

The planar coil s of the outer movable plate and the inner movable plate are then formed by the coil electroforming method. That is to say, a nickel layer is formed on the insulating layer 205 by nickel sputtering, and a copper layer then formed by electroplating or sputtering. The portions corresponding to the planar coil, the electrode terminals and the connection portions between the terminals and the coils are then masked with a positive type resist, and copper etching and nickel etching successively carried out, after which the resist is removed. Copper electroplating is then carried out so that the whole peripheral edge of the nickel layer is covered with copper, thus forming copper layers 206, 207 corresponding to the outer and inner planar coils. By means of this process, the form of the planar coil portion as well as that of the electrode terminal portions 204 and the intersection portion 203 formed by the step shown in FIG. (d), can be built up (see FIG. (f)).

An insulating layer 205 is then formed by a similar process to that of FIG. (e) (see FIG. (g)). With this embodiment, in order to form the planar coils in two layers, then at the time of forming the insulating layer in the step shown in FIG. (g), the terminal portions 208, 209 for connecting the upper and lower coils of both the inner and outer coils are masked so that an insulating layer is not formed.

Then in a similar manner to the step of FIG. (f), copper layers 210, 211 corresponding to an upper layer of planar coils are formed. After this, the insulating layer 205 is formed. In this way, the planar coils 7A, 7B covered with insulation are formed with an insulating layer (see FIGS. (h), (i)).

Silicon dioxide is then sputtered to form an oxide layer, and anisotropic etching carried out from the rear face to cut through the silicon substrate 201, thus forming the respective torsion bar portions and the inner and outer movable plate portions (see FIGS. (j), (k)).

Then after etching to removing the silicon dioxide from the front face, the surface is masked except for the total reflecting mirror portion. The total reflecting mirror 8 is then formed by vapor deposition of aluminum (see FIG. (l)).

In the above manner the movable plate portion is formed.

Figure 17A:
FIGS. 17(a)–(c) are diagrams for explaining the manufacturing steps of a lower glass substrate of the second embodiment.
Figure 17B:
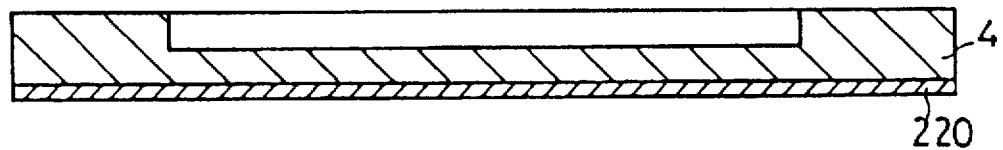
Figure 17C:
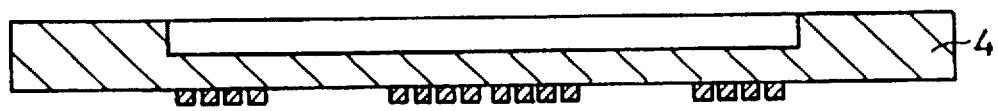

The detection coils formed on the lower glass substrate, are formed according to FIG. 17.

At first, a rectangular shaped recess 4A for ensuring an accommodating space for the movable plate is formed in the lower glass substrate 4 by for example ultrasonic machining (see FIG. (a)).

A metal layer 220 is then formed over the flat surface side of the lower glass substrate 4 by sputtering a metal having good conductivity such as nickel or copper (see FIG. (b)).

The portions forming the detection coils and the electrode terminals are then masked, and the remaining metal layer portion removed by etching. In this way, the detection coils are formed at predetermined locations. The recess 3A of the upper glass substrate 3 is formed in a similar manner to the recess 4A of the lower glass substrate 4 by ultrasonic machining.

The upper glass substrate 3 and the lower glass substrate 4 formed in this manner are respectively joined to the upper and lower faces of the silicon substrate 2 by anodic splicing. The respective permanent magnets 10A–13A and 10B–13B are then be mounted at predetermined locations on the upper and lower glass substrates 3, 4.

By manufacturing in this manner using a semiconductor manufacturing process, manufacture of the two axis planar type mirror galvanometer incorporating a mirror displacement detection function is also simplified, so that mass production becomes possible.

A third embodiment of a mirror galvanometer according to the present invention will now be described with reference to FIG. 18 to FIG. 20.

This third embodiment is a two axis example similar to the second embodiment. Elements the same as in the second embodiment are thus indicated with the same symbols and description is omitted.

Figure 18:
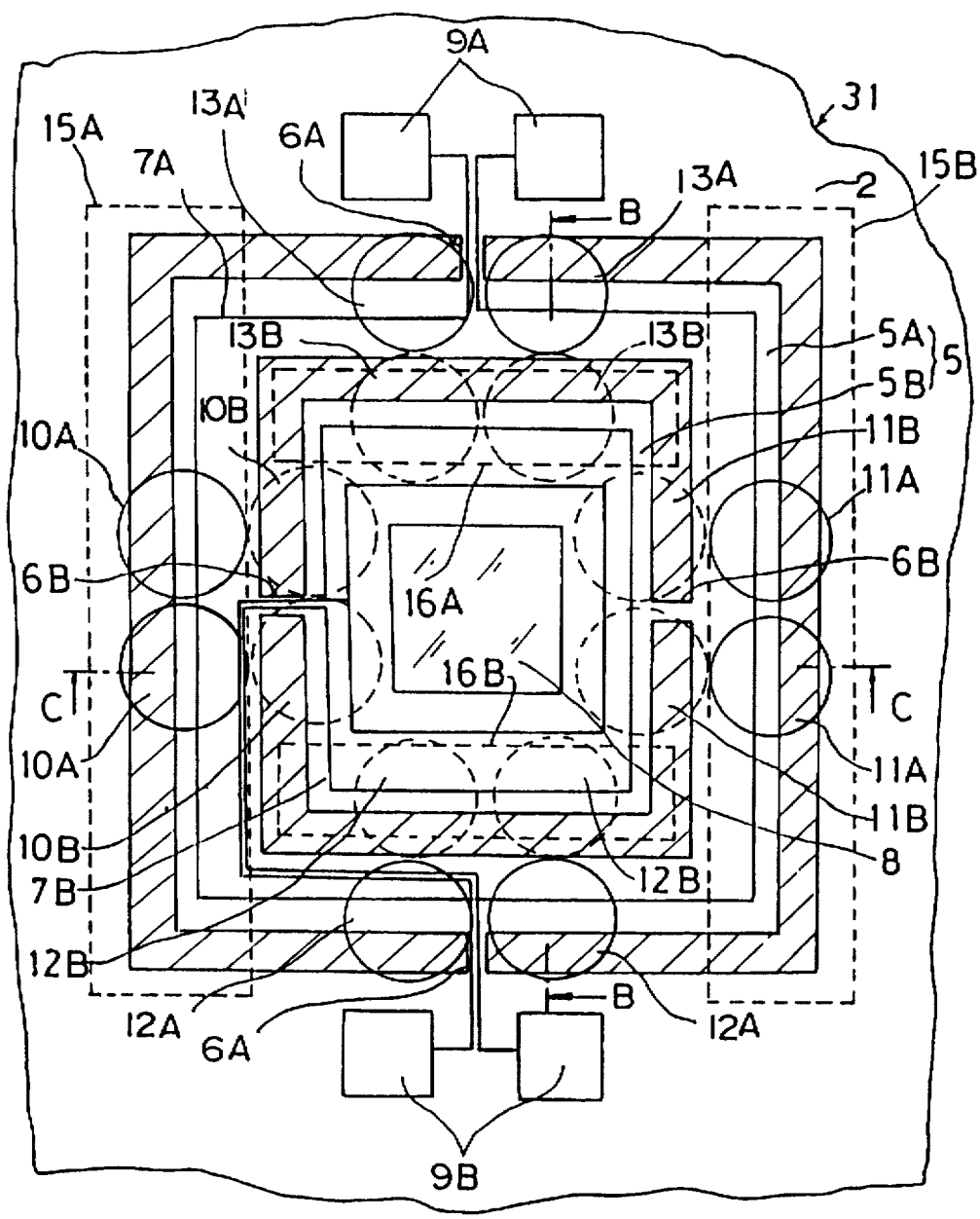
FIG. 18 is a plan view showing the construction of a third embodiment of a mirror galvanometer according to the present invention.
Figure 19:
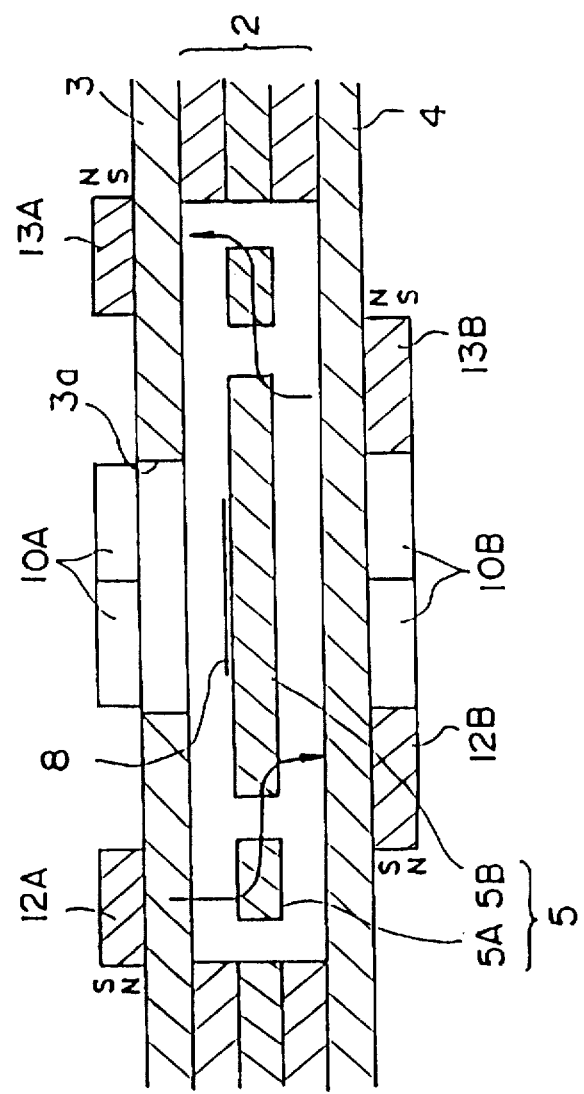
FIG. 19 is a cross sectional view in the direction of arrows B—B of FIG. 18.
Figure 20:
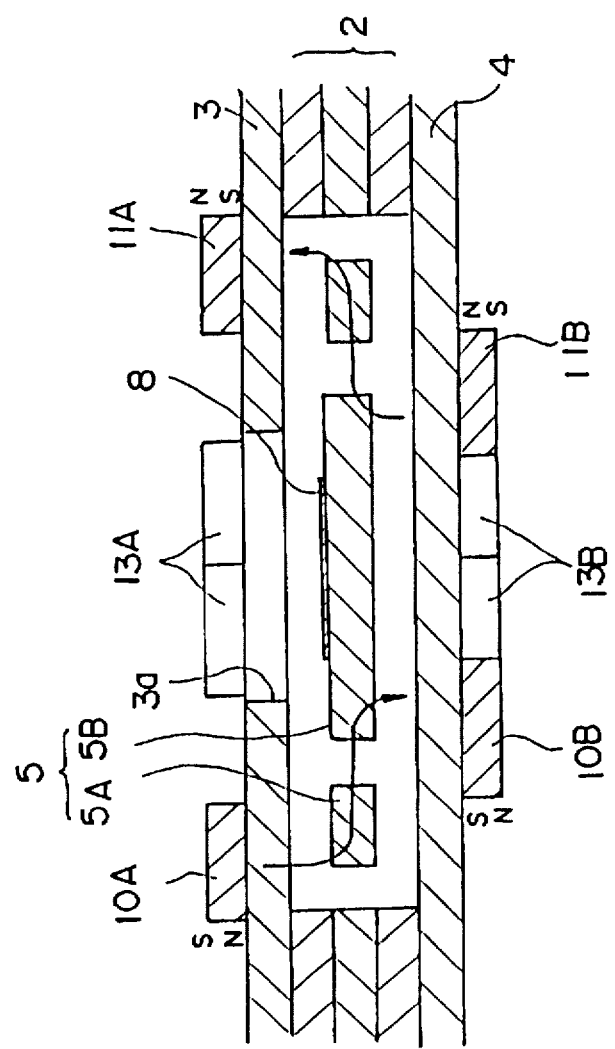
FIG. 20 is a cross sectional view in the direction of arrows C—C of FIG. 18.

In FIG. 18 to FIG. 20, a two axis mirror galvanometer 31 of the third embodiment has approximately the same construction as that of the second embodiment. However with this embodiment, the upper and lower glass substrates 3, 4 are different to those of the second embodiment, being of planar form without the recesses 3A, 4A. Moreover, a rectangular shaped opening 3a corresponding to the shape of the movable plate 5 is provided in a portion of the upper glass substrate 3 above the movable plate 5, so that the region above the total reflecting mirror is open, allowing a laser beam to directly impinge onto the total reflecting mirror 8. Furthermore, since the upper and lower glass substrates 3, 4 are of planar form, then the swinging space for the movable plate 5 is ensured by having a three layer construction involving separate silicon substrates laminated above and below the central silicon substrate 2 with the movable plate 5 formed in the central layer.

Moreover, as shown by the broken line in FIG. 18, detection coils 15A, 15B for displacement detection of the outer movable plate 5A, and detection coils 16A, 16B for displacement detection of the inner movable plate 5B, are provided by patterning on the lower face of the lower glass substrate 4, at locations so as to be capable of electromagnetic coupling with the corresponding planar coils 7A, 7B.

The operation of the planar type mirror galvanometer of the construction of the third embodiment is the same as for the second embodiment and description is omitted. Furthermore, with regards to the manufacturing steps, these are the same as those described for the second embodiment shown in FIG. 16, as far as the step of integrally forming the portions for the movable plate 5 and the torsion bars 6A, 6B on the silicon substrate 2. In the case of the third embodiment, after these steps, upper and lower silicon substrates with openings formed at locations corresponding to the movable plate, are laminated to give a three layer construction for the silicon substrate 2. The upper and lower glass substrates 3, 4 are then joined to the opposite sides of the laminated silicon substrate 2 by anodic splicing, and the permanent magnets mounted on the upper and lower glass substrates 3, 4 at predetermined locations.

With the mirror galvanometer of the third embodiment as described above, as with the second embodiment, in addition to the operational effect of the mirror galvanometer of the first embodiment, laser beam deflection scanning is carried out in two dimensions, with the effect of an increase in the laser beam scanning region.

FIG. 21 through FIG. 25 show measurement data related to the characteristics of the two axis mirror galvanometer.

Figure 21:
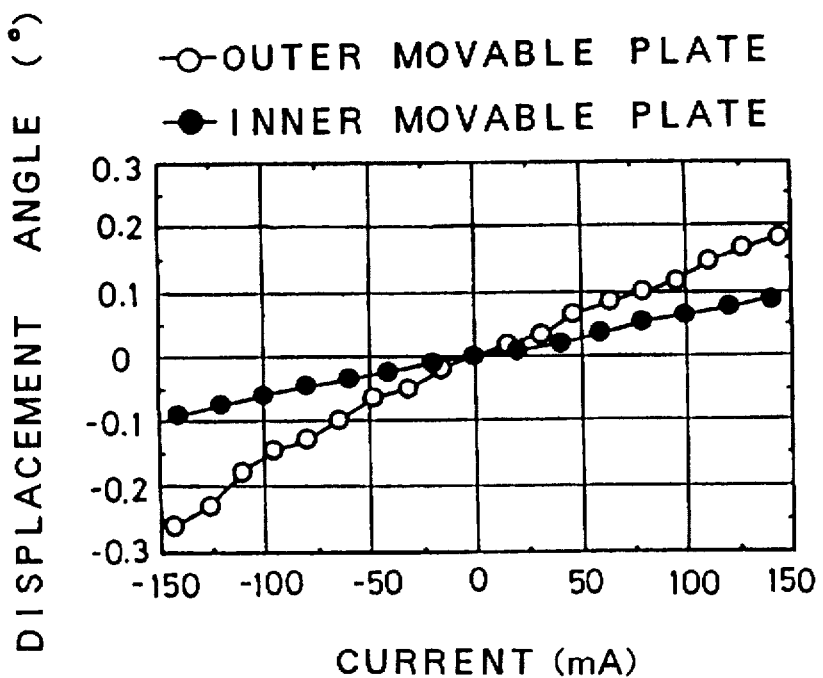
FIG. 21 is a graph of measurement data for a two axes arrangement showing the relationship between displacement angle and DC coil current in the inner and outer movable plates.
Figure 22:
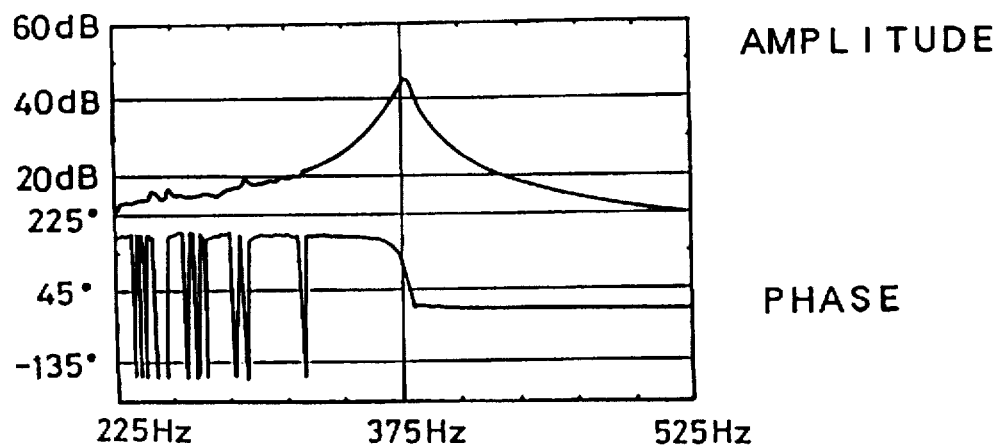
FIG. 22 is a graph of measurement data showing frequency oscillation characteristics of the outer movable plate.
Figure 23:
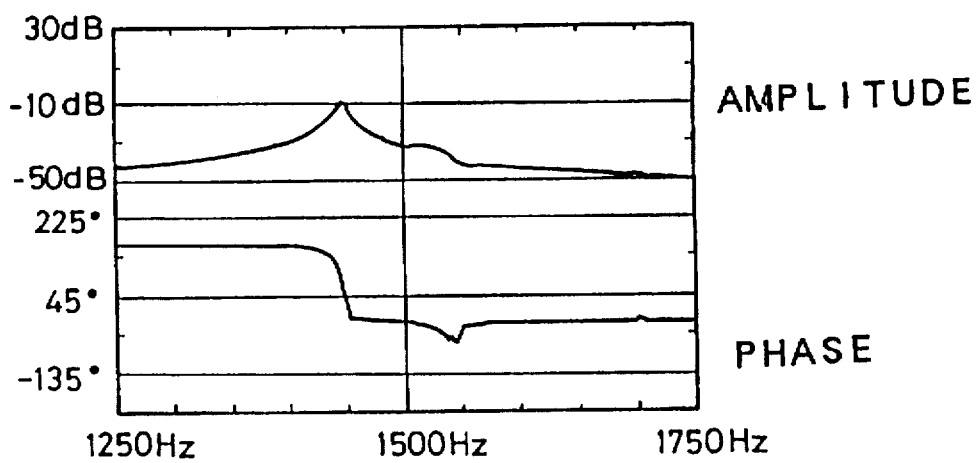
FIG. 23 is a graph of measurement data showing frequency oscillation characteristics of the inner movable plate.
Figure 24:
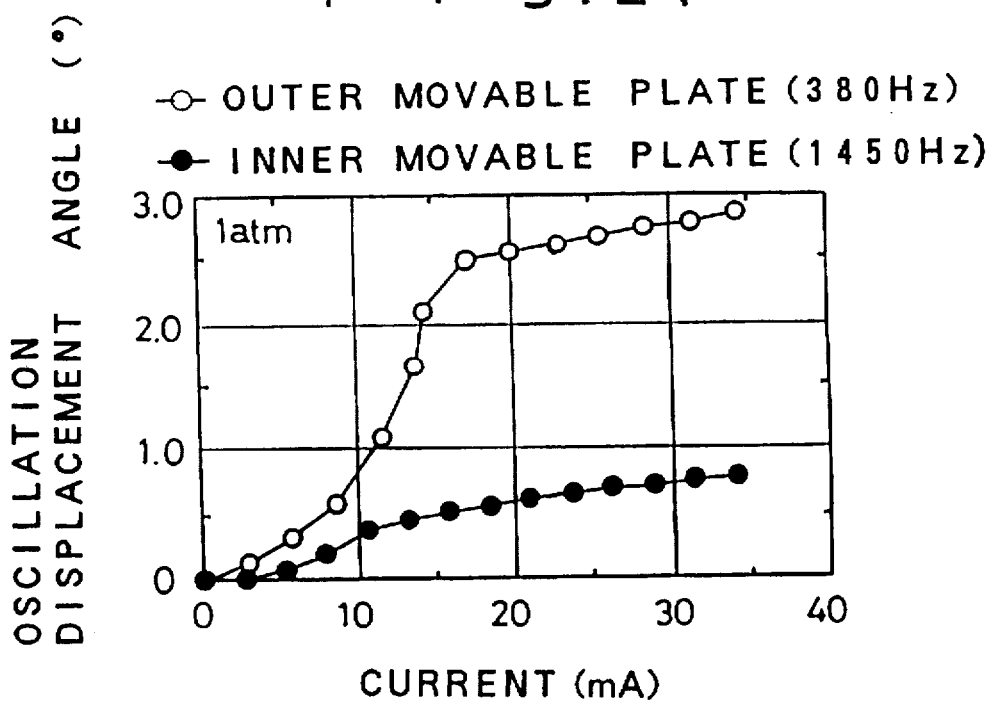
FIG. 24 is a graph of measurement data showing the relationship between displacement angle and AC coil current at the resonant frequencies of the inner and outer movable plates.
Figure 25:
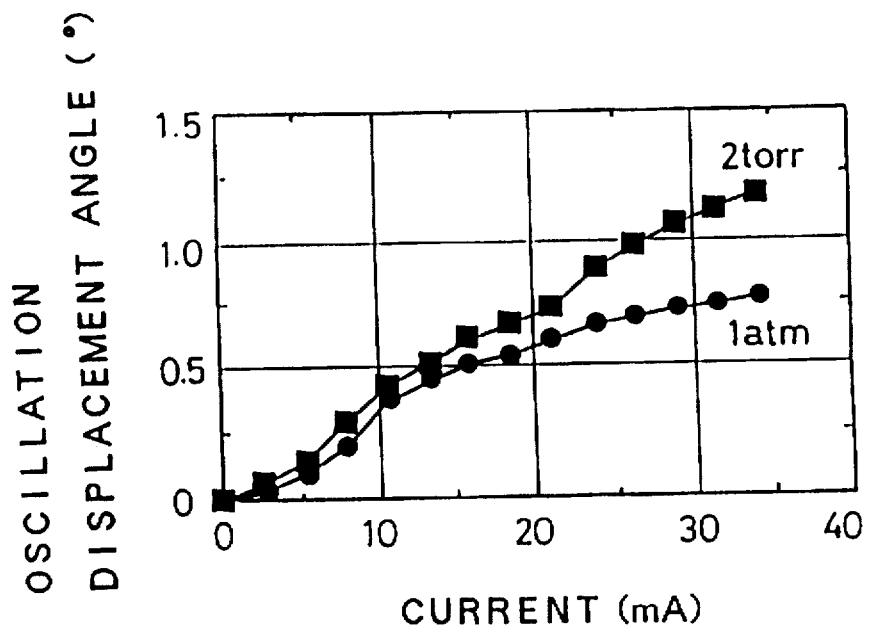
FIG. 25 is a graph of measurement data showing the relationship between AC coil current and displacement angle of the inner movable plate, in a vacuum and in air.

FIG. 21 shows the relation between the DC current flowing in the coil and the displacement angle φ. FIG. 22 and FIG. 23 show the respective frequency characteristics for the oscillation of the outer movable plate and inner movable plate. The resonant frequency is 375 Hz for the outer movable plate, and 1450 Hz for the inner movable plate. FIG. 24 shows the respective relationships between the current and the displacement angle during oscillation when a resonant frequency AC current flows in the coils. FIG. 25 shows the difference in the relationship for the inner movable plate between oscillation displacement angle and AC current, in a vacuum and in air. This shows a more linear relation in the vacuum and a greater oscillation amplitude.

Figure 26:
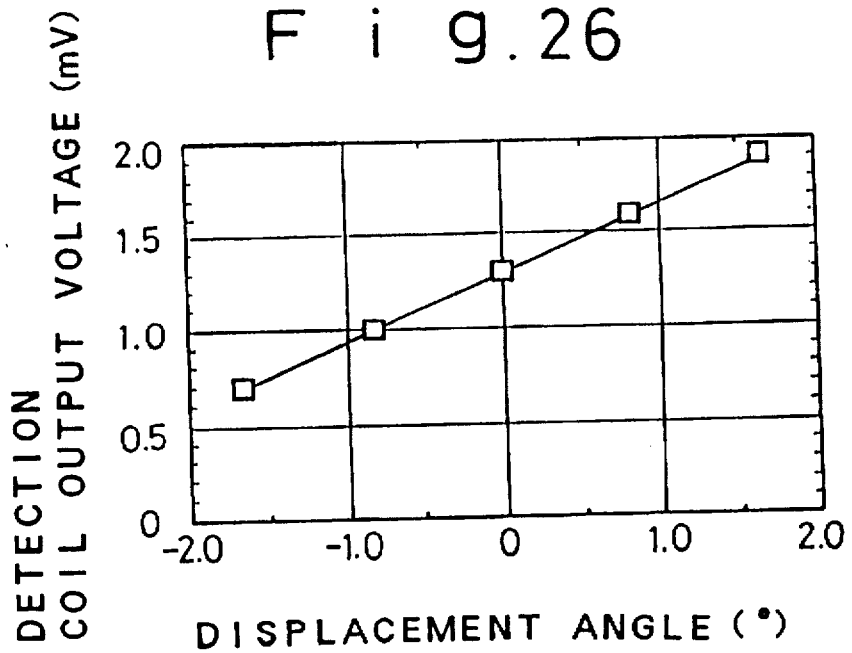
FIG. 26 is a graph of measurement data showing the relationship between displacement angle of the movable plate and detection coil output voltage.

FIG. 26 shows the relation between the displacement angle of the movable plate and the output voltage of the detection coil.

With the mirror galvanometer of the present invention as described above, a semiconductor substrate is formed with a movable plate, a torsion bar for axially supporting the movable plate so as to be swingable, a planar coil, and a reflecting mirror, and permanent magnets are provided on insulating substrates on opposite sides of the semiconductor substrate. Moreover detection coils capable of electromagnetic coupling with the planar coil are provided on a lower insulating substrate which is joined to the semiconductor substrate, and a detection current for detecting displacement of the reflecting mirror is superimposed on the current in the planar coil for driving the reflecting mirror, to detect the displacement angle of the reflecting mirror using the change in mutual inductance between the planar coil and the detection coil with displacement of the reflecting mirror. Due to this construction, the mirror galvanometer can be made using semiconductor element manufacturing techniques, so that an extremely thin and miniaturized galvanometer is possible. Accordingly, miniaturization of light scanning systems using the mirror galvanometer is possible, with the additional effect of achieving miniaturization of equipment adapted for laser light. The mirror displacement angle of this planar type mirror galvanometer, can be accurately detected so that accuracy in controlling displacement angle can be improved. Furthermore, the mirror displacement angle detection function can be easily added, since it is not necessary to modify the construction of the movable plate, the detection coils being merely located on the lower glass substrate, without the addition of new structure to the movable plate. Manufacture is therefore simple compared to providing a conventional displacement angle detection function.

Furthermore, if the support axis for the reflection mirror is of a perpendicularly arranged two axis construction, then deflection scanning of light by the reflecting mirror can be carried out in two dimensions, giving an increase in the degrees of freedom of light scanning, with the effect that the scanning region can be increased.

Moreover, if the swinging space for the movable plate is made a sealed space and evacuated, then air resistance to the movement of the movable plate can be eliminated, with the effect that the responsiveness of the movable plate can be improved. Furthermore, for the case wherein a large drive current is passed through the planar coil to give a large displacement of the movable plate, then by introducing an inert gas into the sealed space, the influence of heat from the planar coil can be suppressed compared to the situation with a vacuum.

INDUSTRIAL APPLICABILITY

With the present invention, as well as enabling thinning and miniaturization of a mirror galvanometer, accuracy in controlling the mirror displacement angle can be improved, enabling the realization of, for example, miniaturization and high performance of equipment using mirror galvanometers. The invention thus has considerable industrial applicability.

We claim:

1. A planar type mirror galvanometer incorporating a displacement detection function, comprising; a semiconductor substrate having a planar movable plate and a torsion bar formed integrally with the semiconductor substrate, the torsion bar supporting said movable plate about a torsion bar axis so that the movable plate is swingable about the axis, a planar coil for generating a magnetic field by means of an electric current for driving the movable plate, laid on an upper face peripheral edge portion of said movable plate, and a reflecting mirror provided on an upper face central portion which is surrounded by said planar coil, and magnets forming pairs with each other fixed to the semiconductor substrate so as to produce a magnetic field at the planar coil portions on the opposite sides of the movable plate which are parallel with the axis of the torsion bar, wherein a plurality of detection coils capable of electromagnetic coupling with said planar coil for detecting displacement of said movable plate are provided adjacent said movable plate and disposed at symmetrical locations with respect to said torsion bar, and a displacement detection current is superimposed on said electric current in the planar coil for driving the movable plate.

2. A planar type mirror galvanometer incorporating a displacement detection function according to claim 1, wherein said movable plate comprises; a frame shape outer movable plate axially supported relative to the semiconductor substrate by a first torsion bar, and an inner movable plate axially supported inside the outer movable plate by a second torsion bar axially perpendicular to said first torsion bar, with a first planar coil provided on an upper face of said outer movable plate, and a second planar coil provided on an upper face peripheral edge portion of said inner movable plate, and said reflecting mirror provided on a central portion of the inner movable plate which is surrounded by said second planar coil, and said detection coils are respectively disposed at symmetrical locations with respect to said first and second torsion bars.

3. A planar type mirror galvanometer incorporating a displacement detection function according to claim 1, wherein an upper substrate and a lower substrate are respectively provided on upper and lower faces of said semiconductor substrate, and said magnets are fixed to the upper substrate and the lower substrate.

4. A planar type mirror galvanometer incorporating a displacement detection function according to claim 3, wherein at least an upper substrate is made from a glass substrate transparent to light, and said upper substrate and lower substrate seal a movable plate accommodating space.

5. A planar type mirror galvanometer incorporating a displacement detection function according to claim 4, wherein said movable plate accommodating space is evacuated.

6. A planar type mirror galvanometer incorporating a displacement detection function according to claim 4, wherein said movable plate accommodating space is filled with an inert gas.

7. A planar type mirror galvanometer incorporating a displacement detection function according to claim 4, wherein said upper and lower substrates have recesses in respective central portions thereof which face each other when fitted to the semiconductor substrate to form said moveable plate accommodating space.

8. A planar type mirror galvanometer incorporating a displacement detection function according to claim 3, wherein said upper and lower substrates are insulating substrates.

9. A planar type mirror galvanometer incorporating a displacement detection function according to claim 1, wherein said magnets are permanent magnets.

* * * * *

UNITED STATES PATENT AND TRADEMARK OFFICE
CERTIFICATE OF CORRECTION

PATENT NO. : 5,767,666
DATED : June 16, 1998
INVENTOR(S) : Norihiro ASADA et al.

It is certified that error appears in the above-identified patent and that said Letters Patent is hereby corrected as shown below:

Title page, item [54] and column 1 line 2, "INCORPOTATING" should read --INCORPORATING--.

Title Page, Item [73], in the assignee, line 1, "Ltd" should read --Ltd.--.

Claim 7, column 22, line 23, "moveable" should read --movable--.

Signed and Sealed this

Third Day of August, 1999

Attest:

Q. TODD DICKINSON

Attesting Officer

Acting Commissioner of Patents and Trademarks